US012342376B2

(12) United States Patent
Sundman et al.

(10) Patent No.: US 12,342,376 B2
(45) Date of Patent: Jun. 24, 2025

(54) SHARING OF TXOP BASED ON SPATIAL MULTIPLEXING

(71) Applicant: Telefonaktiebolaget LM Ericsson (publ), Stockholm (SE)

(72) Inventors: Dennis Sundman, Sollentuna (SE); Leif Wilhelmsson, Lund (SE); Miguel Lopez, Solna (SE); Charlie Pettersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 478 days.

(21) Appl. No.: 17/908,944

(22) PCT Filed: Mar. 5, 2021

(86) PCT No.: PCT/EP2021/055608
§ 371 (c)(1),
(2) Date: Sep. 2, 2022

(87) PCT Pub. No.: WO2021/176062
PCT Pub. Date: Sep. 10, 2021

(65) Prior Publication Data
US 2023/0107240 A1    Apr. 6, 2023

Related U.S. Application Data

(60) Provisional application No. 62/987,170, filed on Mar. 9, 2020, provisional application No. 62/986,486, filed on Mar. 6, 2020.

(51) Int. Cl.
*H04W 74/08* (2024.01)
*H04B 7/06* (2006.01)
*H04W 74/0816* (2024.01)

(52) U.S. Cl.
CPC ...... *H04W 74/0816* (2013.01); *H04B 7/0697* (2013.01)

(58) Field of Classification Search
CPC ....... H04L 5/001; H04L 5/0094; H04L 5/005; H04L 5/0032; H04L 5/00; H04L 5/0057;
(Continued)

(56) References Cited

U.S. PATENT DOCUMENTS

2019/0036583 A1   1/2019   Cherian et al.
2019/0110208 A1   4/2019   Xue et al.

FOREIGN PATENT DOCUMENTS

WO    2021144039 A1    7/2021

OTHER PUBLICATIONS

Sundman, Dennis , et al., "Coordinated AP Spatial Sharing in a TXOP", IEEE 802.11-20/0424r0, Mar. 2020, 11 pages.
(Continued)

*Primary Examiner* — Jung Liu
(74) *Attorney, Agent, or Firm* — Murphy, Bilak & Homiller, PLLC

(57) ABSTRACT

An access point (10) of a wireless communication system configures a carrier for communication with one or more wireless devices (11) associated with the access point (10). Further, the access point (10) contends for access to the carrier and, in response to winning contention for access to the carrier, reserves a transmission opportunity, TXOP, on the carrier. Further, the access point (10) cooperates with one or more other access points (10) of the wireless communication system by sharing the TXOP based on spatial multiplexing of wireless transmissions on the carrier.

26 Claims, 23 Drawing Sheets

(58) Field of Classification Search
CPC .... H04L 5/0053; H04L 5/0073; H04W 76/15; H04W 24/08; H04W 76/20; H04W 76/30; H04W 24/10; H04W 72/23; H04B 7/0634; H04B 7/0626; H04B 7/066; H04B 7/0632; H04J 11/0053
See application file for complete search history.

(56) References Cited

OTHER PUBLICATIONS

"Part 11: Wireless LAN Medium Access Control (MAC) and Physical Layer (PHY) Specifications, Draft Standard for Information technology—Telecommunications and information exchange between systems Local and metropolitan area networks-Specific requirements", IEEE P802.11ax™/D6.0, Amendment 1: Enhancements for High Efficiency WLAN, LAN/MAN Standards Committee of the IEEE Computer Society, 2019, 780 pages.
Ahn, Woojin, et al., "Coordinated Transmission Scheme for 11be", WILUS, doc.: IEEE 802.11-19/927r0, May 16, 2019, 8 pages.
Asai, Yusuke, et al., "Frame Sequence of Interference Management Using Beamforming Technique in OBSS Environment", doc.: IEEE 802.11-10/0831r0, Jul. 12, 2010, 30 pages.
Doostnejad, Roya, et al., "Multi-AP Collaborative BF in IEEE 802.11", Intel Corporation, doc.: IEEE 802.11-19/0772r1, May 8, 2019, 18 pages.
Guo, Jason Yuchen, et al., "Coordinated Spatial Reuse Operation", Huawei Technologies, doc.: IEEE 802.11-20/0033r1, Feb. 6, 2020, 14 pages.
"Part 11: Wireless LAN Medium Access Control (MAC) and Physical Layer (PHY) Specifications", IEEE Std 802.11™-2016; IEEE Standard for Information technology—Telecommunications and information exchange between systems Local and metropolitan area networks—Specific requirements, Dec. 14, 2016, 1-3534.
Verma, Lochan, et al., "Coordinated AP Time/Frequency Sharing in a Transmit Opportunity in 11be", Qualcomm, et al., doc.: IEEE 802.11-19/1582r0, Nov. 2019, 12 pages.
Verma, Lochan, et al., "Coordinated AP Time/Frequency Sharing in a Transmit Opportunity in 11be", Qualcomm, et al., doc.: IEEE 802.11-19/1582r1, Nov. 2019, 16 pages.
Verma, Lochan, et al., "Gain Analysis of Coordinated AP Time/Frequency Sharing in a Transmit Opportunity in 11be", Qualcomm, et al., doc.: IEEE 802.11-19/1879r0, Nov. 2019, 7 pages.
Yu, Ross Jian, et al., "Sounding procedure in AP collaboration", Huawei et al., doc.: IEEE 802.11-19/1097r0, Jul. 15, 2019, 12 pages.

SHARING OF TXOP BASED ON SPATIAL MULTIPLEXING

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHZ ISM (Industrial, Scientific and Medical) band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth and effectively no competing technology in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has something to send. Effectively there is no difference in channel access whether the station is an access point (AP) or a non-access point (non-AP). DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized, similar to channel access schemes utilized in cellular networks. Such centralized channel access may involve that rather than letting a station access the channel whenever it has data to send, the channel access is controlled by the AP. A corresponding channel access scheme is for example supported in the IEEE 802.11ax technology, see IEEE P802.11ax™/D6.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". The IEEE 802.11ax technology for example supports orthogonal frequency division multiple access (OFDMA) in both downlink (DL), i.e., in a direction from the AP to the station, and uplink (UL), i.e., in a direction from the station to the AP. Also multi-user transmission in form of multi-user multiple input multiple output (MU-MIMO) is supported for both the DL and the UL. By supporting MU transmission and letting the AP control the channel access, efficient channel usage is achieved and one can avoid collisions due to contention within a cell, in the IEEE 802.11 terminology also referred to as basic service set (BSS).

A default channel access mechanism used in current WLAN systems is referred to as enhanced distributed channel access (EDCA), as specified in IEEE Standard for Information technology—Telecommunications and information exchange between systems Local and metropolitan area networks—Specific requirements-Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 PHY Specifications". In the EDCA channel access mechanism, the STA accesses the channel using a set of channel access parameters based on a traffic class of the data. The channel is obtained for a TXOP (transmission opportunity) duration time, in which multiple frames of the same data class may be transmitted. The maximum size of a TXOP depends on the data type. For best effort and background data, the maximum TXOP duration is 6 ms.

To improve the performance even further, coordination of channel usage between cells may be utilized. Here, one approach is to let a number of APs share a TXOP. For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as cooperating or coordinated APs (CAP).

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. As illustrated in FIG. 1, the mechanism utilizes three phases: A first phase, a second phase, and a third phase. The first phase involves transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The first phase may also be referred to as initial coordination phase. In the second phase the TXOP owner informs the participating APs about their allocated resources and a TX start time, and the participating APs inform their client STAs about their respective resource allocations. In the third phase the participating APs transmit on their respective allocated resources in the TXOP, beginning at the TX start time.

FIG. 2A schematically further illustrates sharing of a TXOP on a carrier based on TDMA (Time Division Multiple Access), assuming a carrier bandwidth of 80 MHz. In this case different time slots in the TXOP are assigned to the APs participating in the TXOP sharing. The example of FIG. 2A involves four APs, denoted as AP1, AP2, AP3, and AP4. For the sake of a better overview, stations associated with the APs are omitted from the illustration of FIG. 2A. AP1 is assumed to be the TXOP owner, and AP2, AP3, and AP4 are APs participating in TXOP sharing of the TXOP. In the example of FIG. 2A, DL data transmission is triggered by a TF sent by AP1. Then AP1 sends one or more first DL data transmissions to its associated station(s), utilizing the full 80 MHz bandwidth of the carrier. Successful reception of the first DL data transmission(s) is then acknowledged by one or more ACK (acknowledgement) frames from the associated station(s) of AP1. Subsequently, AP2 sends one or more second DL data transmissions to its associated station(s), utilizing the full 80 MHz bandwidth of the carrier. Successful reception of the second DL data transmission(s) is then acknowledged by one or more ACK frames from the associated station(s) of AP2. Subsequently, AP3 sends one or more third DL data transmissions to its associated station(s), utilizing the full 80 MHZ bandwidth of the carrier. Successful reception of the third DL data transmission(s) is then acknowledged by one or more ACK frames from the associated station(s) of AP3. Finally, AP4 sends one or more fourth DL data transmissions to its associated station(s), utilizing the full 80 MHz bandwidth of the carrier. Successful reception of the fourth DL data transmission(s) is then acknowledged by one or more ACK frames from the associated station(s) of AP4.

FIG. 2B schematically further illustrates sharing of a TXOP on a carrier based on OFDMA (Orthogonal Frequency Division Multiple Access), assuming a carrier bandwidth of 80 MHz. In this case different parts of the full carrier bandwidth of 80 MHz are assigned to the APs participating in the TXOP sharing. Similar to the example of FIG. 2A, the example of FIG. 2B involves four APs, denoted as AP1, AP2, AP3, and AP4. For the sake of a better overview, stations associated with the APs are omitted from the illustration of FIG. 2B. AP1 is assumed to be the TXOP owner, and AP2, AP3, and AP4 are APs participating in TXOP sharing of the TXOP. In the example of FIG. 2B, DL data transmission is triggered by a TF sent by AP1. Then AP1 sends one or more first DL data transmissions to its associated station(s), utilizing a first part of the carrier bandwidth. Simultaneously, AP2 sends one or more second DL data transmissions to its associated station(s), utilizing a second part of the carrier bandwidth, AP3 sends one or more third DL data transmissions to its associated station(s), utilizing a third part of the carrier bandwidth, and AP4 sends one or more fourth DL data transmissions to its associated station(s), utilizing a fourth part of the carrier bandwidth. Successful reception of the DL data transmission(s) is then acknowledged by one or more ACK frames from the associated station(s) of the APs, which are transmitted in the respective part of the carrier bandwidth assigned to the AP.

The above-mentioned sharing of the TXOP based on TDMA or OFDMA may allow for achieving an improved latency. However, the achievable throughput is similar to the standard EDCA mechanism.

Accordingly, there is a need for techniques which allow for improved sharing of a TXOP, e.g., with respect to achievable throughput.

SUMMARY

According to an embodiment, a method of controlling wireless transmissions in a wireless communication system is provided. According to the method, an access point of the wireless communication system configures a carrier for communication with one or more wireless devices associated with the access point. Further, the access point contends for access to the carrier and, in response to winning contention for access to the carrier, reserves a transmission opportunity on the carrier. Further, the access point cooperates with one or more other access points of the wireless communication system by sharing the transmission opportunity based on spatial multiplexing of wireless transmissions on the carrier.

According to a further embodiment, a method of controlling wireless transmissions in a wireless communication system is provided. According to the method, an access point of the wireless communication system configures a carrier for communication with one or more wireless devices associated with the access point. Further, the access point contends for access to the carrier and, in response to another access point winning contention for access to the carrier, the access point cooperates at least with the access point winning the contention by sharing, based on spatial multiplexing of wireless transmissions on the carrier, a transmission opportunity reserved on the carrier by the access point winning the contention.

According to a further embodiment, a method of controlling wireless transmissions in a wireless communication system is provided. According to the method, a wireless device configures a carrier for communication with an access point of the wireless communication system. In a transmission opportunity reserved on the carrier and shared by the access point and one or more other access points of the wireless communication system based on spatial multiplexing of wireless transmissions on the carrier, the wireless device receives at least one spatially multiplexed wireless transmission from the access point or sends at least one spatially multiplexed wireless transmission to the access point.

According to a further embodiment, an access point for a wireless communication system is provided. The access point is configured to configure a carrier for communication with one or more wireless devices associated with the access point. Further, the access point is configured to contend for access to the carrier and, in response to winning contention for access to the carrier, reserve a transmission opportunity on the carrier. Further, the access point is configured to cooperate with one or more other access points by sharing the transmission opportunity based on spatial multiplexing of wireless transmissions on the carrier.

According to a further embodiment, an access point for a wireless communication system is provided. The access point comprises at least one processor and a memory. The memory contains instructions executable by said at least one processor, whereby the access point is operative to configure a carrier for communication with one or more wireless devices associated with the access point. Further, memory contains instructions executable by said at least one processor, whereby the access point is operative to contend for access to the carrier and, in response to winning contention for access to the carrier, reserve a transmission opportunity on the carrier. Further, memory contains instructions executable by said at least one processor, whereby the access point is operative to cooperate with one or more other access points by sharing the transmission opportunity based on spatial multiplexing of wireless transmissions on the carrier.

According to a further embodiment, an access point for a wireless communication system is provided. The access point is configured to configure a carrier for communication with one or more wireless devices associated with the access point. Further, the access point is configured to contend for access to the carrier and, in response to another access point winning contention for access to the carrier, cooperate at least with the access point winning the contention by sharing, based on spatial multiplexing of wireless transmissions on the carrier, a transmission opportunity reserved by the access point winning the contention.

According to a further embodiment, an access point for a wireless communication system is provided. The access point comprises at least one processor and a memory. The memory contains instructions executable by said at least one processor, whereby the access point is operative to configure a carrier for communication with one or more wireless devices associated with the access point. Further, the memory contains instructions executable by said at least one processor, whereby the access point is operative to contend for access to the carrier and, in response to another access point winning contention for access to the carrier, cooperate at least with the access point winning the contention by sharing, based on spatial multiplexing of wireless transmissions on the carrier, a transmission opportunity reserved by the access point winning the contention.

According to a further embodiment, a wireless device for a wireless communication system is provided. The wireless device is configured to configure a carrier for communication with an access point of the wireless communication system. Further, the wireless device is configured to, in a transmission opportunity reserved on the carrier and shared by the access point and one or more other access points of the wireless communication system based on spatial multiplexing of wireless transmissions on the carrier, receive at least one spatially multiplexed wireless transmission from the access point or send at least one spatially multiplexed wireless transmission to the access point.

According to a further embodiment, a wireless device for a wireless communication system is provided. The wireless device comprises at least one processor and a memory. The memory contains instructions executable by said at least one processor, whereby the wireless device is operative to configure a carrier for communication with an access point of the wireless communication system. Further, the memory contains instructions executable by said at least one processor, whereby the wireless device is operative to, in a transmission opportunity reserved on the carrier and shared by the access point and one or more other access points of the wireless communication system based on spatial multiplexing of wireless transmissions on the carrier, receive at least one spatially multiplexed wireless transmission from the access point or send at least one spatially multiplexed wireless transmission to the access point.

According to a further embodiment of the invention, a computer program or computer program product is provided, e.g., in the form of a non-transitory storage medium, which comprises program code to be executed by at least one processor of an access point for a wireless communication system. Execution of the program code causes the access point to configure a carrier for communication with one or more wireless devices associated with the access point. Further, execution of the program code causes the access point to contend for access to the carrier and, in response to winning contention for access to the carrier, reserve a transmission opportunity on the carrier. Further, execution of the program code causes the access point to cooperate with one or more other access points by sharing the transmission opportunity based on spatial multiplexing of wireless transmissions on the carrier.

According to a further embodiment of the invention, a computer program or computer program product is provided, e.g., in the form of a non-transitory storage medium, which comprises program code to be executed by at least one processor of an access point for a wireless communication system. Execution of the program code causes the access point to configure a carrier for communication with one or more wireless devices associated with the access point. Further, execution of the program code causes the access point to contend for access to the carrier and, in response to another access point winning contention for access to the carrier, cooperate at least with the access point winning the contention by sharing, based on spatial multiplexing of wireless transmissions on the carrier, a transmission opportunity reserved by the access point winning the contention.

According to a further embodiment of the invention, a computer program or computer program product is provided, e.g., in the form of a non-transitory storage medium, which comprises program code to be executed by at least one processor of a wireless device for a wireless communication system. Execution of the program code causes the wireless device to configure a carrier for communication with an access point of the wireless communication system. Further, execution of the program code causes the wireless device to, in a transmission opportunity reserved on the carrier and shared by the access point and one or more other access points of the wireless communication system based on spatial multiplexing of wireless transmissions on the carrier, receive at least one spatially multiplexed wireless transmission from the access point or send at least one spatially multiplexed wireless transmission to the access point.

Details of such embodiments and further embodiments will be apparent from the following detailed description of embodiments.

DETAILED DESCRIPTION

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP (3rd Generation Partnership Project).

Figure 1:
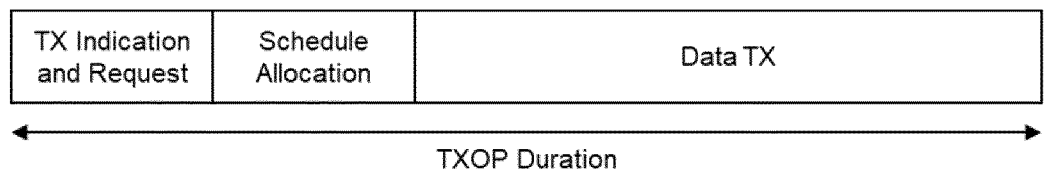
FIG. 1 schematically illustrates an example of phases of a procedure for sharing of a TXOP by multiple APs.
Figure 2A:
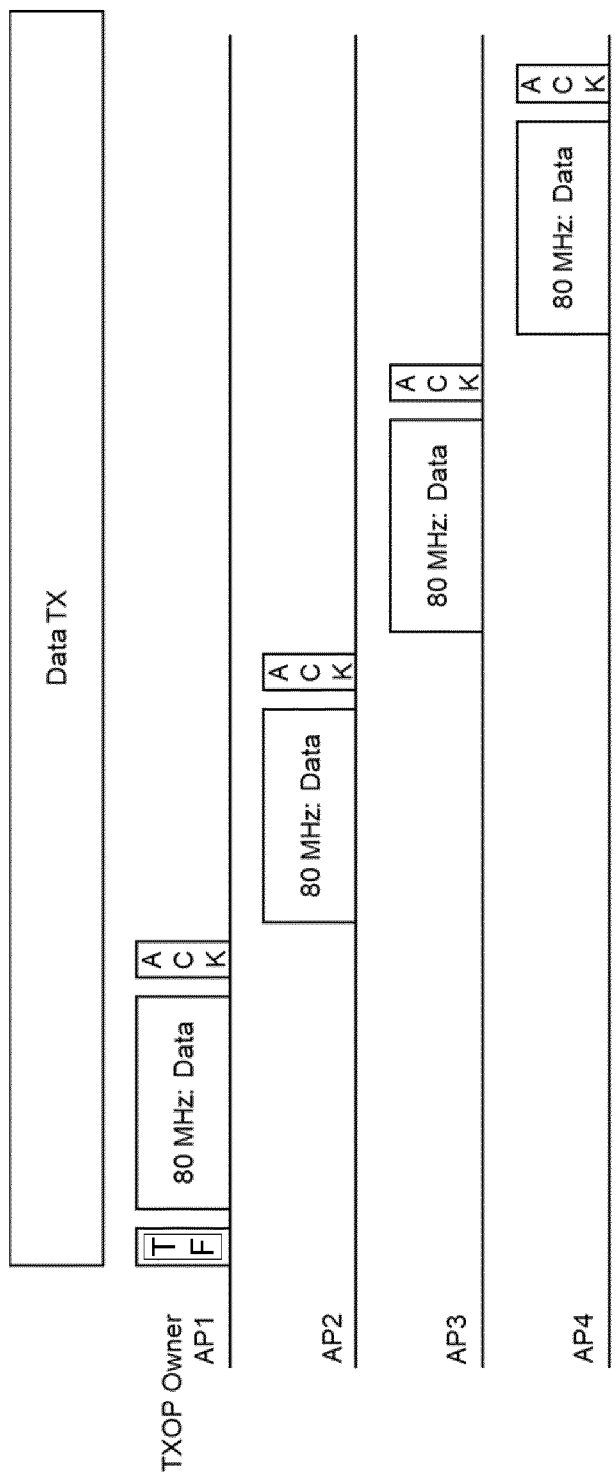
FIG. 2A illustrates an example of sharing of the TXOP based on TDMA.
Figure 2B:
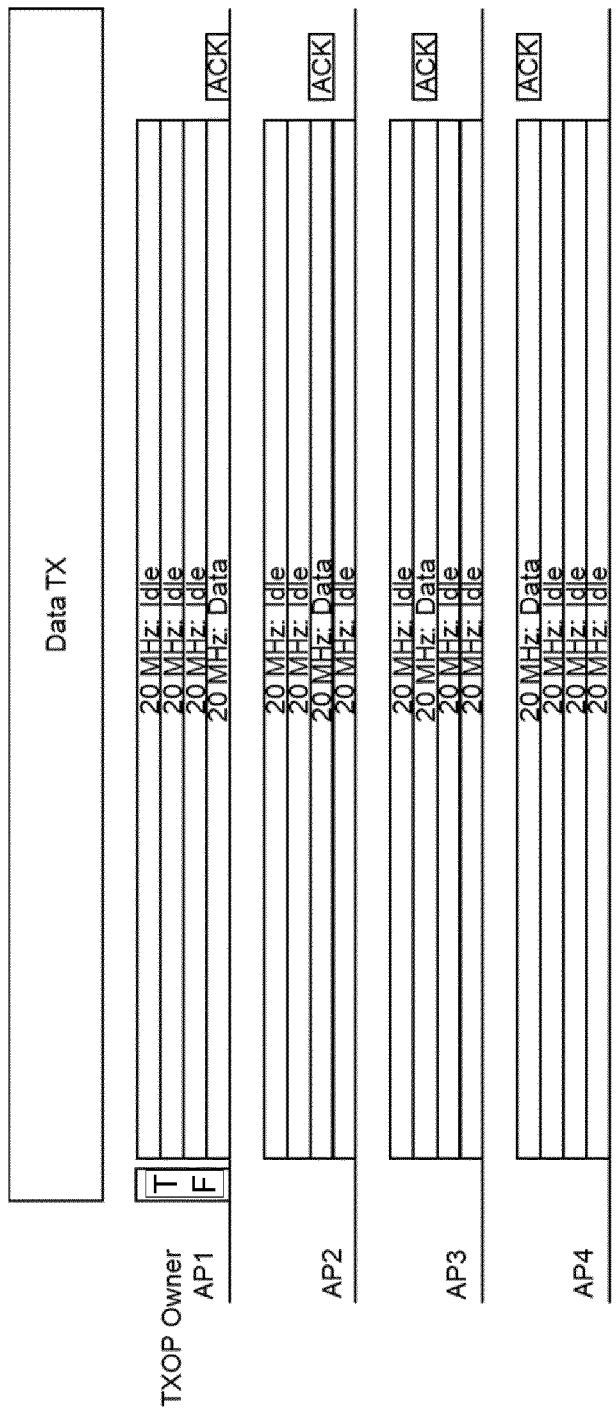
FIG. 2B illustrates an example of sharing of the TXOP based on OFDM.
Figure 3:
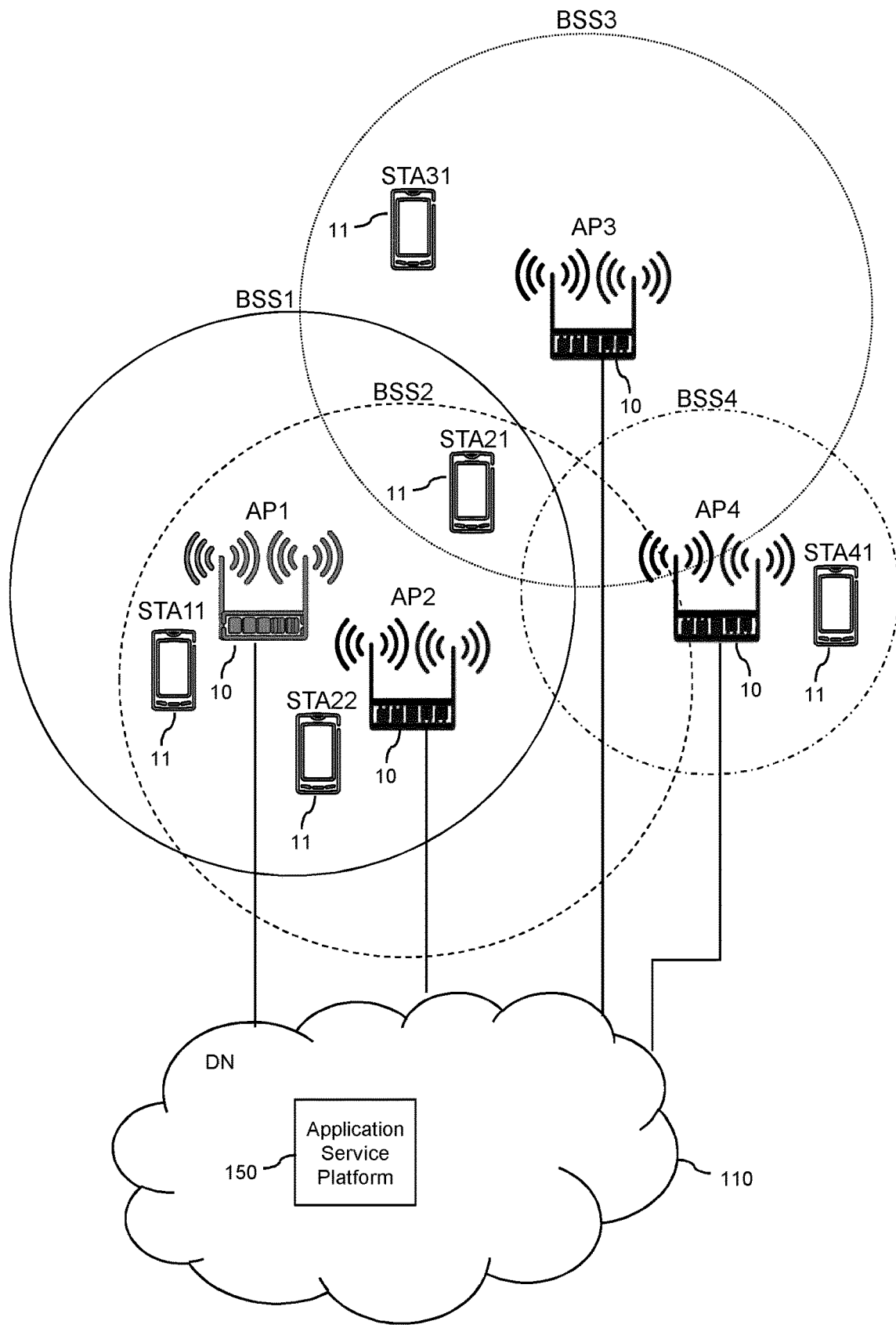
FIG. 3 schematically illustrates a wireless communication system according to an embodiment.

FIG. 3 illustrates an exemplary wireless communication system according to an embodiment. In the illustrated example, the wireless communication system includes multiple APs 10, in the illustrated example referred to as AP1, AP2, AP3, AP4, and multiple stations (STAs) 11, in the illustrated example referred to as STA11, STA21, STA22, STA31, and STA41. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The station STA41 is served by AP4 (in a third BSS denoted as BSS3). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 3, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 3 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 3, coordination between the cells or BSSs may be utilized. In the illustrated examples, the involved APs 10 are assumed to contend for and share common resources. In particular, two or more of the APs 10 may contend for the same carrier in order to obtain a TXOP. Then, the winning AP 10 can share the resources with the other contending APs in a dynamic fashion. For example, it can share the resources differently in different TXOPs.

Figure 4:
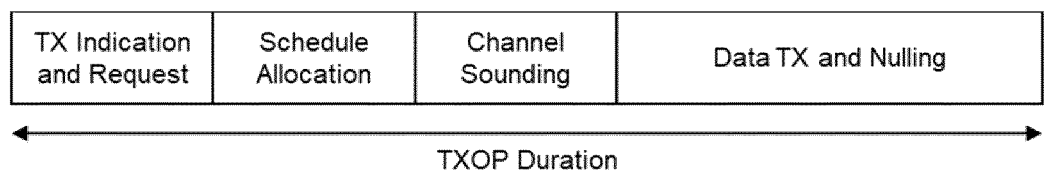
FIG. 4 schematically illustrates an example of phases of a procedure for sharing of a TXOP based on spatial multiplexing according to an embodiment.

The illustrated concepts are based on using spatial multiplexing for sharing a TXOP by multiple APs. This may involve providing a spatial channel sounding phase in a TXOP sharing procedure, as schematically illustrated in FIG. 4. As can be seen, the TXOP sharing procedure utilizes four phases: A first phase, a second phase, a third phase, and a fourth phase. The first phase involves transmission of a TX indication frame and a request frame. In the first phase an AP that has gained a TXOP, i.e., the TXOP owner, indicates to other APs that it is willing to share the TXOP (by means of the TX indication frame), and one or more neighboring APs indicate their intention to participate in sharing the resources (by the request frame). The first phase may also be referred to as initial coordination phase. In the second phase the TXOP owner informs the participating APs about their allocated resources and a TX start time, and the participating APs inform their client STAs about their respective resource allocations. The second phase may also be referred to as a scheduling phase. In the fourth phase, the APs participating in the sharing of the TXOP, i.e., the TXOP owner and the other participating APs, as well as the stations associated with the participating APs, perform spatial channel sounding. In the fourth phase the participating perform spatially multiplexed wireless transmissions on their respective allocated resources in the TXOP, beginning at the TX start time. These spatially multiplexed wireless transmissions are based on the spatial channel sounding of the third phase. In FIG.

4, the four phases are denoted as "TX Indication and Request", "Schedule Allocation", "Channel sounding", and "Data TX and Nulling", respectively.

In the illustrated concepts, multiple BSSs can utilize the same time and frequency resources. Interference can be avoided by placing beamforming nulls and synchronization. In the illustrated concepts, the spatial channel sounding phase may be used for explicit training of beamforming to be applied in the Data TX with Nulling phase.

Figure 5:
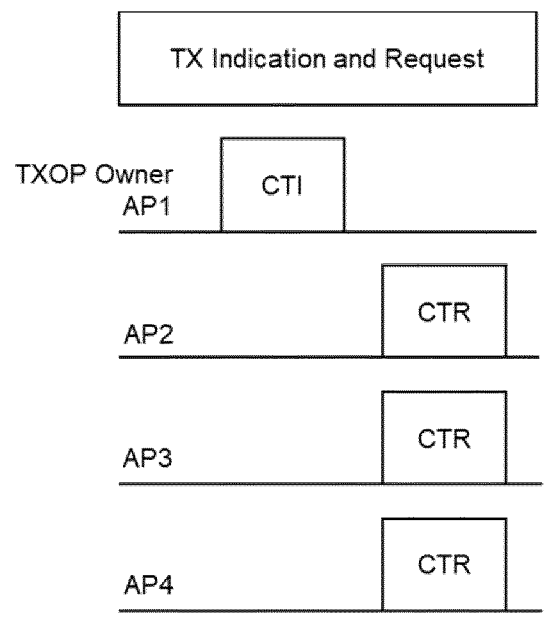
FIG. 5 schematically illustrates an initial coordination phase of the procedure.

FIG. 5 illustrates further details of the initial coordination phase, assuming a scenario with four APs, denoted as AP1, AP2, AP3, and AP4. These APs may for example correspond to the APs 10 in the scenario of FIG. 3. In the example of FIG. 5, the TXOP owner, i.e., AP1 first sends a CTI (CAP TXOP Indication frame), and the APs willing to participate in the sharing of the TXOP, i.e., AP2, AP3, and AP4, respond with a CTR (CAP TXOP Request frame). By means of the CTI, AP1 notifies the other APs that it has obtained the TXOP and is willing to share it. Some participating APs may support sharing of the TXOP based on spatial multiplexing, in the following also denoted as CAP-SDMA (CAP Spatial Division Multiple Access). The CTR message may include one or more of the following information: a support flag for CAP-SDMA, indicating whether or not the participating AP supports CAP-SDMA, the number of TX antennas in the participating AP, the number of associated stations with data for DL, the number of RX (receive) antennas in the above stations, the priority of the data for the stations, the TX (transmit) power of one or more stations in the BSS served by the participating AP.

Figure 6:
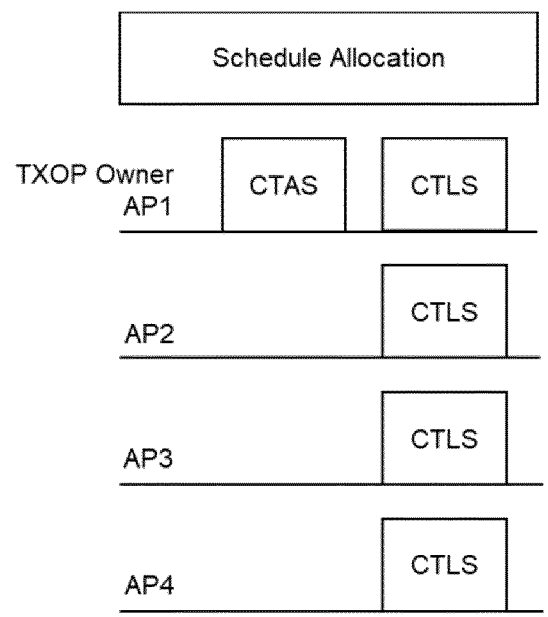
FIG. 6 schematically illustrates a scheduling phase of the procedure.

FIG. 6 illustrates further details of the scheduling phase, again assuming a scenario with four APs, denoted as AP1, AP2, AP3, and AP4. These APs may for example correspond to the APs 10 in the scenario of FIG. 3. In the example of FIG. 6, the TXOP owner, i.e., AP1, informs the participating APs, i.e., AP2, AP3, AP3, about their allocated resources and the TX start time, and the participating APs inform their associated stations about their respectively allocated resources according to local scheduling within the BSS of the participating AP.

In the example of FIG. 6, the TXOP owner, i.e., AP1 first notifies the participating APs, i.e., AP2, AP3, and AP4, whether or not they can use the shared TXOP, using a message referred to as CAP TXOP AP Schedule (CTAS). The CTAS message may include an indication which APs are participating in the sharing of the TXOP. Further, the CTAS message may include an indication whether CAP-SDMA is to be used or not.

Further, the CTAS message may indicate an order in which the APs are to participate in spatial channel sounding. For example, for those APs participating in the sharing of the TXOP, each AP may be assigned a number corresponding the order in which it is to participate in the spatial channel sounding, and these numbers may be indicated in the CTAS message.

Further, each AP may be assigned a time when to perform spatial channel sounding, and this time may be indicated in the CTAS message.

Further, each AP may be assigned a unique subset of indices between 1 and the number of transmit antennas in the AP. Rows of a precoder matrix, corresponding to the subset of indices, may then be assigned to the stations associated with the AP. The respective assignment of the indices and rows of the precoder matrix for the different APs may be indicated in the CTAS message.

Further, the CTAS message may indicate various timing information for the spatial channel sounding phase. For example, the CTAS message may indicate the size or duration of spatial channel sounding for each AP participating in the sharing of the TXOP. The latter may in particular be useful when utilizing VHT like sounding (as further explained below).

Further, the CTAS message may indicate, for each participating AP, a number of spatial streams to use for DL data transmission in the shared TXOP and/or a number of spatial streams to be used for nulling other BSSs in the shared TXOP.

Further, the CTAS message may indicate, for each participating AP, a number of associated stations which can be scheduled for DL data transmission in the shared TXOP. Further, the CTAS message may indicate, for each participating AP, explicit information which associated stations cane be scheduled for DL data transmission in the shared TXOP.

Further, the CTAS message may indicate, for each participating AP, a maximum allowed TX power.

Subsequently the participating APs, i.e., AP1, AP2, AP3, AP3 notify their respectively associated station in the BSS about a local schedule, using a message referred to as CAP TXOP Local Schedule (CTLS). The CTLS message may include an indication which associated stations are to participate in DL data transmission in the shared TXOP. Further, the CTLS message may indicate timing information defining when the associated stations are to respond with feedback information. Further, the CTLS message may include information about which spatial channel sounding technique is to be used in the spatial channel sounding phase.

The spatial channel sounding phase may consist of two sub-phases: In a first sub-phase, sounding frames are transmitted from the participating APs. These frames may be NDP (non-data packet) frames, e.g., as used in the VHT sounding protocol according to the IEEE 802.11 PHY Specifications or as used in the HE sounding protocol according to the IEEE 802.11ax Draft. In the VHT sounding protocol, multiple beamformees can reply to a single NDP training frame in a sequential manner, as for example illustrated in FIG. 10-53 of the IEEE 802.11 PHY Specifications. The HE sounding protocol supports MU (multi-user) feedback, as for example illustrated in FIG. 26-8 of the IEEE 8201.11ax Draft. In the latter example, a HE NDP Announcement, transmitted before the NDP training frame, and a Beamforming Report Poll (BFRP) Trigger contain user fields with various information for the beamformees.

The NDP frames are sent to the associated stations of the AP as well as to stations associated with in neighboring BSSs. The NDP frames may be orthogonal among the participating APs. The orthogonality of the NDP frames can be achieved by time-multiplexing of the NDP frames. The time-multiplexing ordering of APs can be based on information from the CTAS message. Alternatively, the orthogonality of the NDP frames can be achieved by extended precoder matrices. This may be particularly interesting for joint transmissions. The NDP frames may be transmitted with a TX power indicated in the schedule allocation phase, e.g., by the CTAS message.

A second sub-phase of the spatial channel sounding phase, the scheduled stations respond with beamforming feedback (BF) frames. In some scenarios, the BF frames may be multicast frames addressed to multiple APs. Alternatively, at least some of the BF frames could also be multiple unicast frames each addressed to another AP. In some scenarios, the beamforming feedback may be sent in a similar manner as in the VHT sounding protocol, e.g., triggered by a BFRP. In some scenarios, the beamforming feedback may be sent in a similar manner as in the HE sounding protocol, e.g., by utilizing MU feedback. In some scenarios, also a combination of features of the VHT sounding protocol and features of the HE sounding protocol could be used.

It is noted that in some scenarios, the spatial channel sounding may re-use the CTLS messages of the scheduling phase, thereby reducing overhead of the spatial channel sounding.

Figure 7:
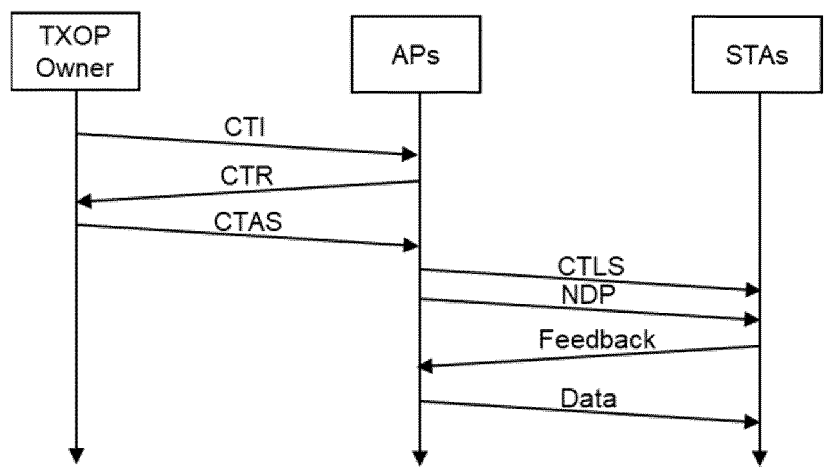
FIG. 7 schematically illustrates exchange of information in a spatial channel sounding phase of the procedure.

FIG. 7 further illustrates an example of messages exchanged by the TXOP owner, e.g., AP1 in the above examples, the participating APs, e.g., AP2, AP3, and AP4 in the above examples, and the stations (STAs) respectively associated with the APs. As illustrated, the TXOP owner first sends the CTI message to the other APs, and the APs respond with the CTR message. The TXOP owner then sends the CTAS message to the APs, and the APs send the CTLS to their respective associated stations. Further, in the spatial channel sounding phase the APs send the NDP frames to the stations and receive the beamforming feedback from the stations. The beamforming feedback is then utilized for controlling the beamforming and nulling in the transmission of DL data to the stations.

Figure 8:
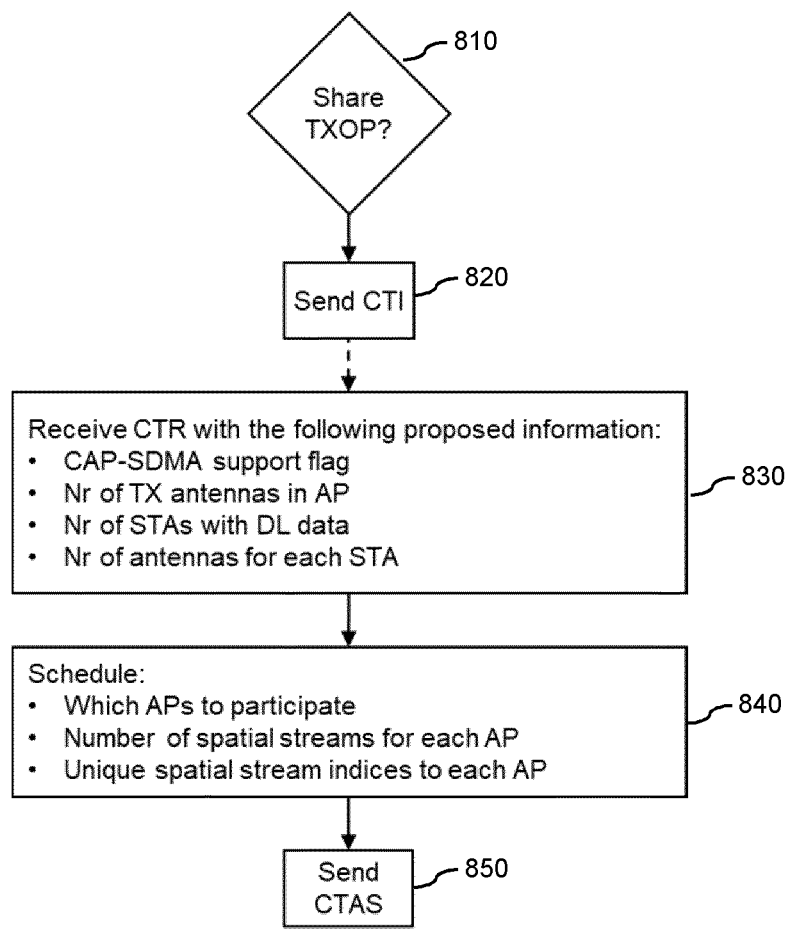
FIG. 8 shows processes at the TXOP owner for TXOP sharing based on spatial multiplexing according to an embodiment.

FIG. 8 shows a flowchart for further illustrating processes performed by the TXOP owner, e.g., AP1 in the above examples.

At block 810, the TXOP owner decides whether to share the TXOP. If the TXOP owner decides to share the TXOP, the TXOP owner proceeds to sending the CTI message, as indicated by block 820. The CTI message indicates that the TXOP owner offers to share the TXOP.

In response to the CTI message, the TXOP owner then receives one or more CTR messages from other APs willing to participate in the sharing of the TXOP, as illustrated by block 830. The CTR message may include: the above-mentioned CAP-SDMA support flag, an indication of the number of TX antennas of the AP, a number of stations associated with the AP and requiring transmission of DL data, and/or a number of antennas available at the respective associated station.

The TXOP owner then proceeds by scheduling the TXOP, as indicated by block 840. In block 840 the TXOP owner determines various information for coordinating the sharing of the TXOP based on spatial multiplexing. This information may include: which APs are allowed to participate in the sharing of the TXOP, a number of spatial streams assigned to each participating AP, and/or unique indices of spatial streams assigned to the respective APs.

At block 850, the TXOP owner then sends one or more CTAS messages to the APs participating in the sharing of the TXOP, indicating the information determined at block 840. Further, the TXOP owner may also send a CTLS message to the stations associated with the TXOP owner.

Figure 9:
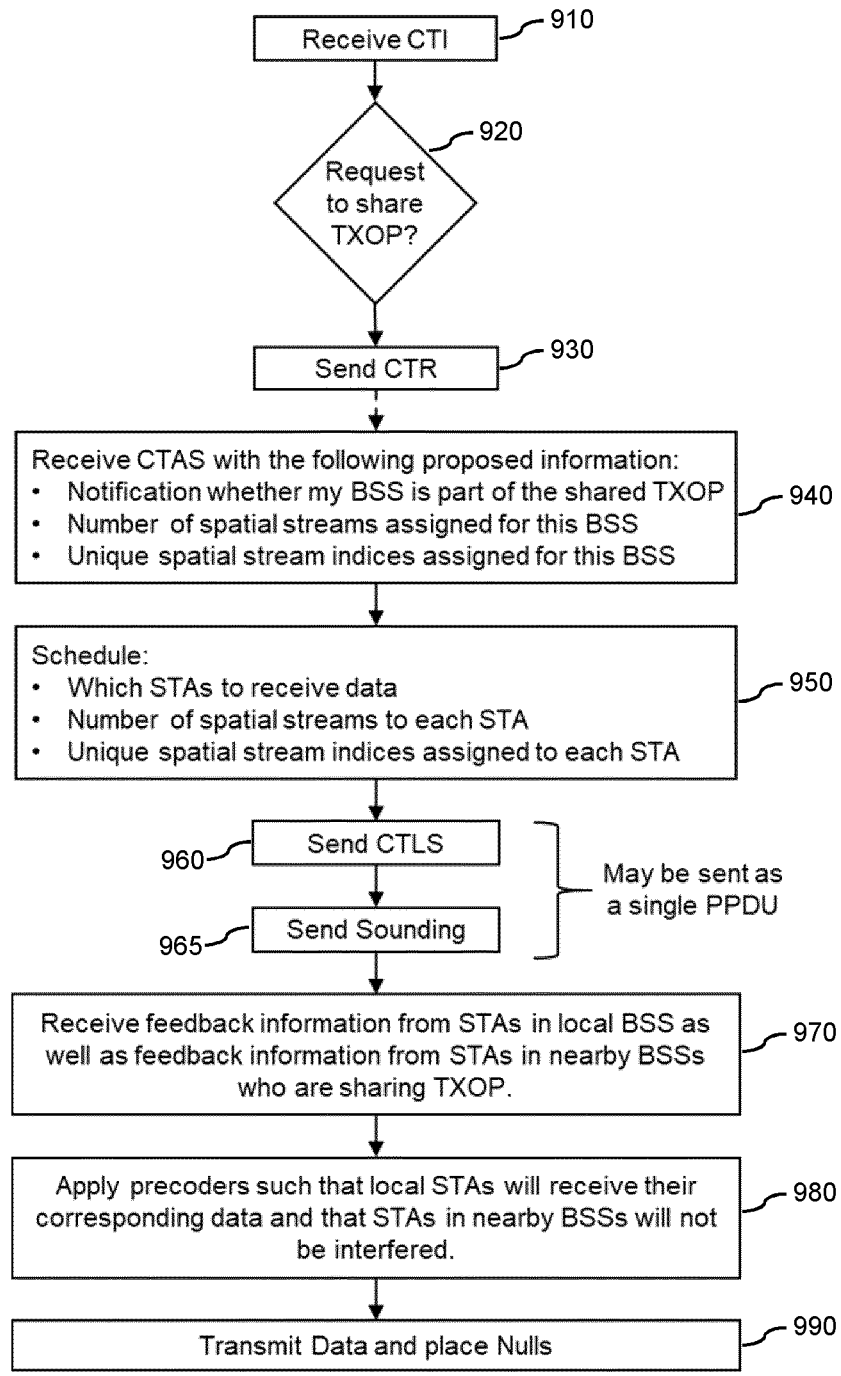
FIG. 9 shows at a participating AP processes for TXOP sharing based on spatial multiplexing according to an embodiment.

FIG. 9 shows a flowchart for further illustrating processes performed by a participating AP, e.g., AP2, AP3, or AP4 in the above examples.

At block 910, the AP receives the CTI message from the TXOP owner. The CTI message indicates that the TXOP owner offers to share the TXOP. The AP then decides whether it should participate in the sharing of the TXOP, i.e., whether it should respond by sending a CTR message, as indicated by block 920. If this is the case, the AP proceeds by sending the CTR message to the TXOP owner, as indicated by block 930.

At block 940, the AP receives the CTAS message from the TXOP owner. The CTAS message may include the following information: a notification whether the BSS of the AP is part of the shared TXOP, a number of spatial streams assigned for the BSS of the AP, and/or unique indices of spatial streams assigned to the BSS of the AP.

The AP then proceeds by locally scheduling the TXOP, as indicated by block 950. In block 950 the AP determines various information for locally coordinating the sharing of the TXOP based on spatial multiplexing. This information may include: which stations in the BSS of the AP are to receive data in the TXOP, a number of spatial streams assigned to each station which is to receive data in the TXOP, and/or unique indices of spatial streams assigned to the respective stations which are to receive data in the TXOP.

At block 960, the AP then send the CTLS message to the stations in the BSS of the AP. The CTLS message indicates information as determined at block 950.

At block 965, the AP proceeds by sending sounding signals. Here, it is noted that the sounding signals are transmitted to be also receivable by stations in other BSS which are part of the shared TXOP. As indicated, the sending of the sounding signals and the sending of the CTLS message may also be combined in a single PPDU (Physical Protocol Data Unit). For example, a single PPDU could include the CTLS message and an NDP announce message.

At block 970, the AP receives beamforming feedback information from the stations in the BSS of the AP and also from the stations in the other BSS which are part of the shared TXOP.

At block 980, the AP utilizes the beamforming information received at block 980 to determine precoders which avoid interference of the DL data transmissions to the stations in the BSS of the AP with DL data transmissions to stations in other BSS which are part of the shared TXOP.

At block 990, the AP transmits the DL data, utilizing the precoders determined at block 980. Here, the precoders ensure that beamforming nulls are appropriately placed to avoid interference on DL data transmissions to stations in other BSS which are part of the shared TXOP.

Figure 10:
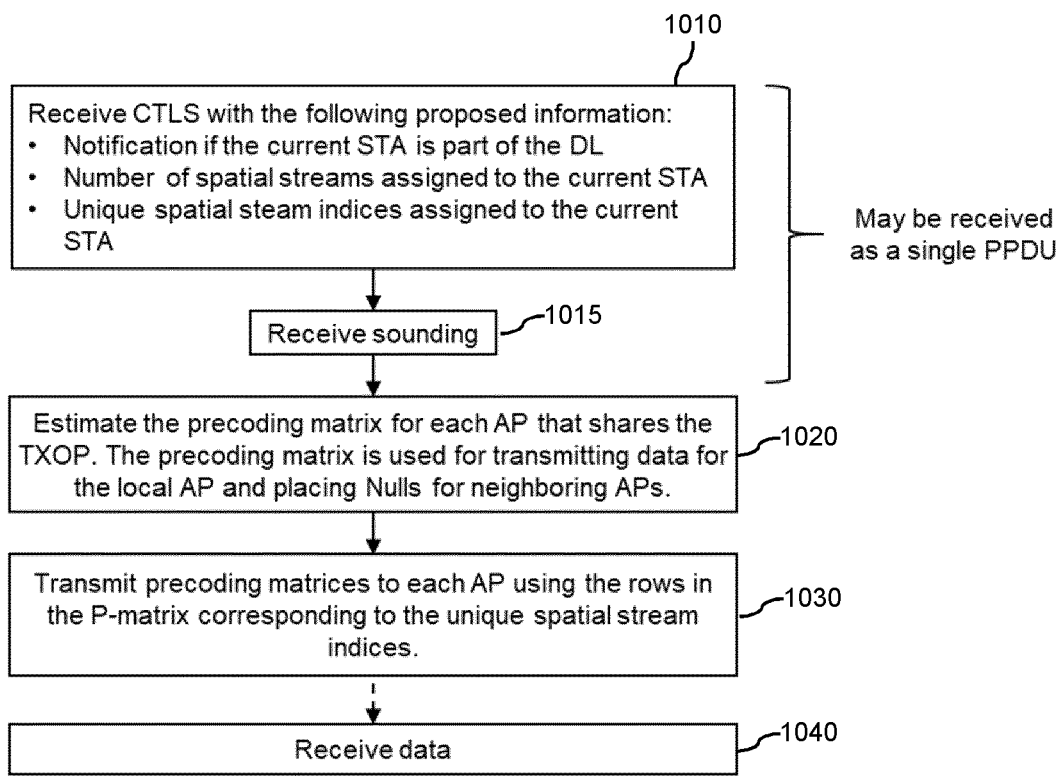
FIG. 10 shows processes at an associated station for TXOP sharing based on spatial multiplexing according to an embodiment at the TXOP owner.

FIG. 10 shows a flowchart for further illustrating processes performed by a station, e.g., one of the stations 11 illustrated in FIG. 3.

At block 1010, the station receives the send CTLS message from its associated AP. The CTLS message indicates information for scheduling transmit and receive operations of the station in the shared TXOP. This information may include: whether the station is part of the shared TXOP, i.e., whether the station is to receive data in the TXOP, a number of spatial streams assigned to the station, and/or unique indices of spatial streams assigned to the station.

At block 1015, the station receives sounding signals. As indicated, the reception of the sounding signals and the reception of the CTLS message may also be combined in a single PPDU (Physical Protocol Data Unit). For example, a single PPDU could include the CTLS message and an NDP announce message.

At block 1020, the station evaluates the sounding signals received at block 1015. This may involve that the station determines a precoding matrix for each AP participating in the sharing of the TXOP. The precoding matrix is determined with the aim of enabling the station to receive DL data transmissions from its associated AP while avoiding interference with DL data transmissions to stations in other BSS which are part of the shared TXOP, by appropriately placing beamforming nulls. It is noted that in some scenarios the evaluation of block 1020 may also provide intermediate results which enable determination of the precoding matrix by the APs.

At block 1030, the station reports the precoding matrices (or intermediate results enabling determination of the precoding matrices), to the APs participating in the sharing of the TXOP. In some scenarios, the reporting of block 1030 may utilize beamformed transmissions to the APs, e.g., based on rows of the precoder matrix which correspond to the unique spatial stream indices indicated in the CTLS.

At block 1040, the station receive the DL data transmissions in the shared TXOP. These DL data transmissions are spatially multiplexed with other DL data transmissions, utilizing the precoders from the evaluation and reporting of blocks 1020 and 1030.

In the following, further aspects of the spatial channel sounding for TXOP sharing will be explained in connection with FIGS. 11 to 17.

As mentioned above, the spatial channel sounding may be regarded as being divided into two sub-phases: a "sounding" phase and a "feedback" phase. In the sounding phase, all participating APs send their sounding signals through multicast or broadcast. Once the sounding phase is over, in the feedback phase, the STAs in each BSS responds with the feedback to each AP. As further detailed below, the feedback phase may be based on multi-AP feedback reports, which include the feedback to the several APs in one frame.

Figure 11:
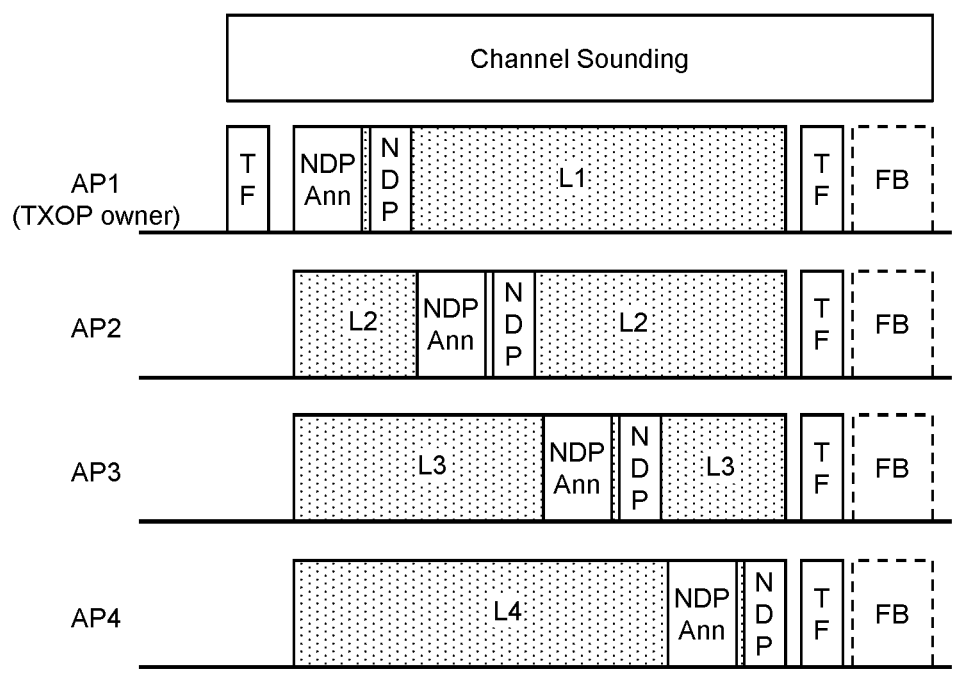
FIG. 11 illustrates an example of implementing the spatial channel sounding phase based on HE (High Efficiency) like channel sounding.

FIG. 11 illustrates an example of implementing the spatial channel sounding on the basis of a HE like sounding mechanism. This sounding mechanism re-uses some features of the HE sounding protocol and allows for providing the spatial channel sounding phase with a relatively short duration (of about 1 ms). The HE like sounding mechanism may use UL-MU-MIMO to enable simultaneous transmission of feedback by multiple stations. For this purpose, each station may have a unique subset of the precoder matrix assigned to it. As compared to the HE sounding protocol, the HE like sounding mechanism of the illustrated example may have the following modifications: The spacing between NDP and trigger may be of arbitrary size. This spacing may either be signaled in the NDP Announcement, or not signaled at all. The Multi-AP FB frame may be broadcasted or multicasted to multiple APs. Alternatively, several unicast feedback frames, each addressed to a different AP, could be used. The same trigger frame (TF) may be repeated for all APs, i.e., be identical for all BSSs, participating in the sharing of the TXOP. User specific information may be moved from the trigger frame to the NDP Announcement, and only stations addressed in the NDP Announcement may get triggered by the trigger frame. Since the stations in different BSSs are transmitting simultaneously, a global scheduling of the subset of the precoder matrix assigned to the stations may be utilized. For example, corresponding scheduling information can be distributed from the TXOP owner to the participating APs in the CTAS message(s). Further, the NDP Announcement, and the NDP frames, could be part of the CTLS frame.

In the example of FIG. 11, the spatial channel sounding phase begins with a trigger frame sent by the TXOP owner, in the illustrated example AP1. The APs participating in the sharing of the TXOP then start transmitting sounding signals, each at separate time intervals within the sounding phase. In particular, AP1 first sends an NDP Announcement followed by an NDP frame. After that, AP2 sends an NDP Announcement followed by an NDP frame. After that, AP3 sends an NDP Announcement followed by an NDP frame. After that, AP4 sends an NDP Announcement followed by an NDP frame. Based on the NDP frames transmitted by AP1, AP2, AP3, and AP4, the stations in BSS1 assess the spatial channels to AP1, AP2, AP3, and AP4, as denoted by learning phase L1. Similarly, based on the NDP frames transmitted by AP1, AP2, AP3, and AP4, the stations in BSS2 assess the spatial channels to AP1, AP2, AP3, and AP4, as denoted by learning phase L2, the stations in BSS3 assess the spatial channels to AP1, AP2, AP3, and AP4, as denoted by learning phase L3, and the stations in BSS4 assess the spatial channels to AP1, AP2, AP3, and AP4, as denoted by learning phase L4.

After the sounding phase, each AP sends a trigger frame (TF) to trigger Multi-AP beamforming feedback (denoted by FB) from the stations. The Multi-AP beamforming feedback indicates the results of channel assessment for each station and is provided to each AP participating in the sharing of the TXOP. In the example of FIG. 11, the stations transmit the Multi-AP beamforming feedback simultaneously, utilizing MU-MIMO for avoiding interference.

Figure 12:
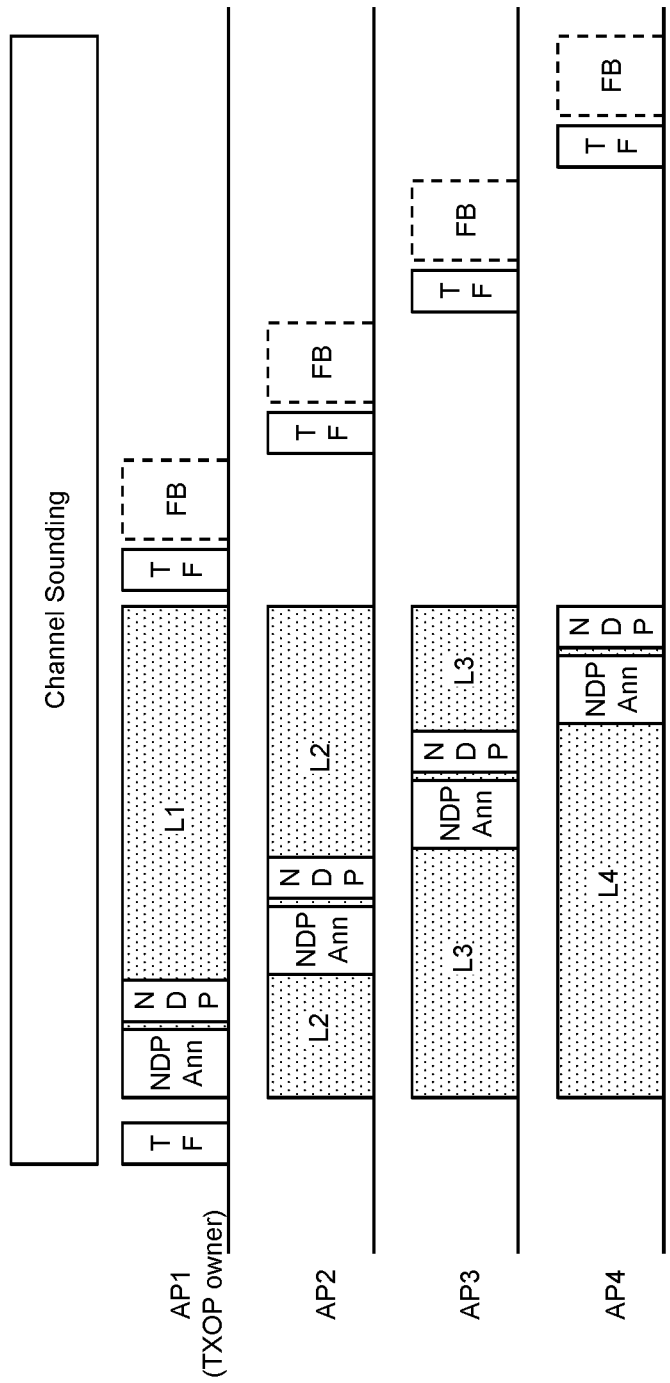
FIG. 12 illustrates a further example of implementing the spatial channel sounding phase based on HE like channel sounding.

FIG. 12 illustrates a further example of implementing the spatial channel sounding on the basis of a HE like sounding mechanism. The example of FIG. 12 is similar to that of FIG. 11, but uses time-division multiplexing for transmission of the Multi-AP beamforming feedback by the stations. That is to say, in the feedback phase first the stations associated with AP1 transmit the Multi-AP beamforming feedback, triggered by a trigger frame from AP1. Subsequently, the stations associated with AP2 transmit the Multi-AP beamforming feedback, triggered by a trigger frame from AP2. Subsequently, the stations associated with AP3 transmit the Multi-AP beamforming feedback, triggered by a trigger frame from AP3. Finally, the stations associated with AP4 transmit the Multi-AP beamforming feedback, triggered by a trigger frame from AP4.

As compared to the example of FIG. 11, the example of FIG. 12 may use individual trigger frames at each AP for triggering sending the beamforming feedback, similar as in the HE sounding protocol. On the other hand, a longer duration of the feedback phase is needed. It is noted that also in the example of FIG. 12, MU-MIMO may be used for sending the Multi-AP beamforming feedback, but in this case only for simultaneous transmission within each BSS.

Figure 13:
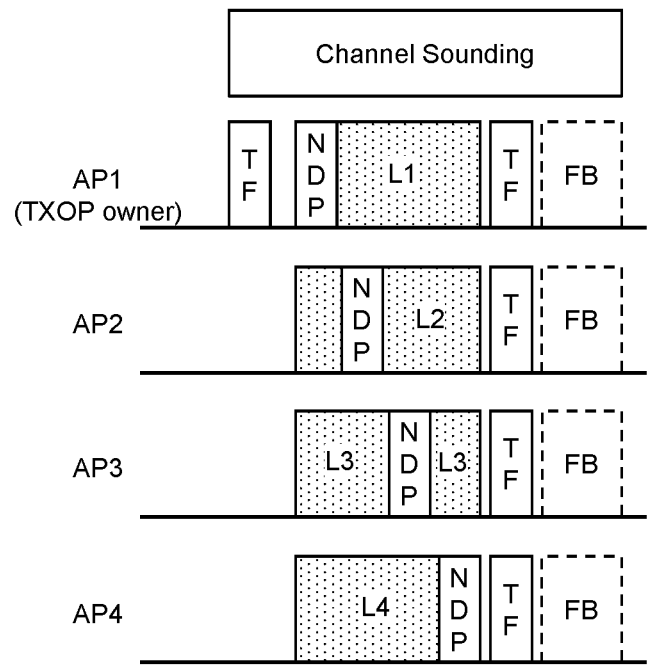
FIG. 13 illustrates a further example of implementing the spatial channel sounding phase based on HE like channel sounding.

FIG. 13 illustrates a further example of implementing the spatial channel sounding on the basis of a HE like sounding mechanism. The example of FIG. 13 is similar to that of FIG. 11, but does not require transmission of NDP Announcements. Functionalities of the NDP Announcements may in this case be provided by the CTAS or CTLS messages. In the example of FIG. 13, the duration of the sounding phase may thus be shortened.

Figure 14:
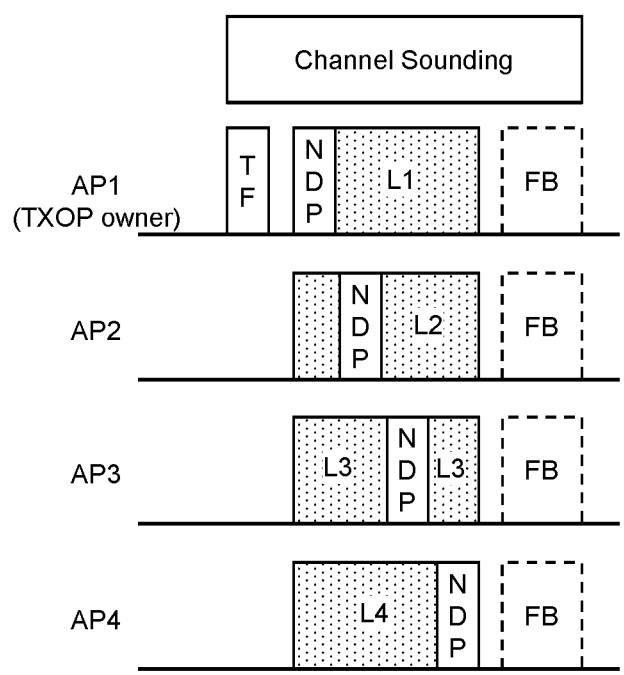
FIG. 14 illustrates a further example of implementing the spatial channel sounding phase based on HE like channel sounding.

FIG. 14 illustrates a further example of implementing the spatial channel sounding on the basis of a HE like sounding mechanism. The example of FIG. 14 is similar to that of FIG. 13, but does not require transmission of trigger frames for initiating transmission of the Multi-AP beamforming feedback. In this case, the Multi-AP beamforming feedback could be scheduled by the CTAS or CTLS messages. In the example of FIG. 14, the duration of the feedback phase may be shortened.

Figure 15:
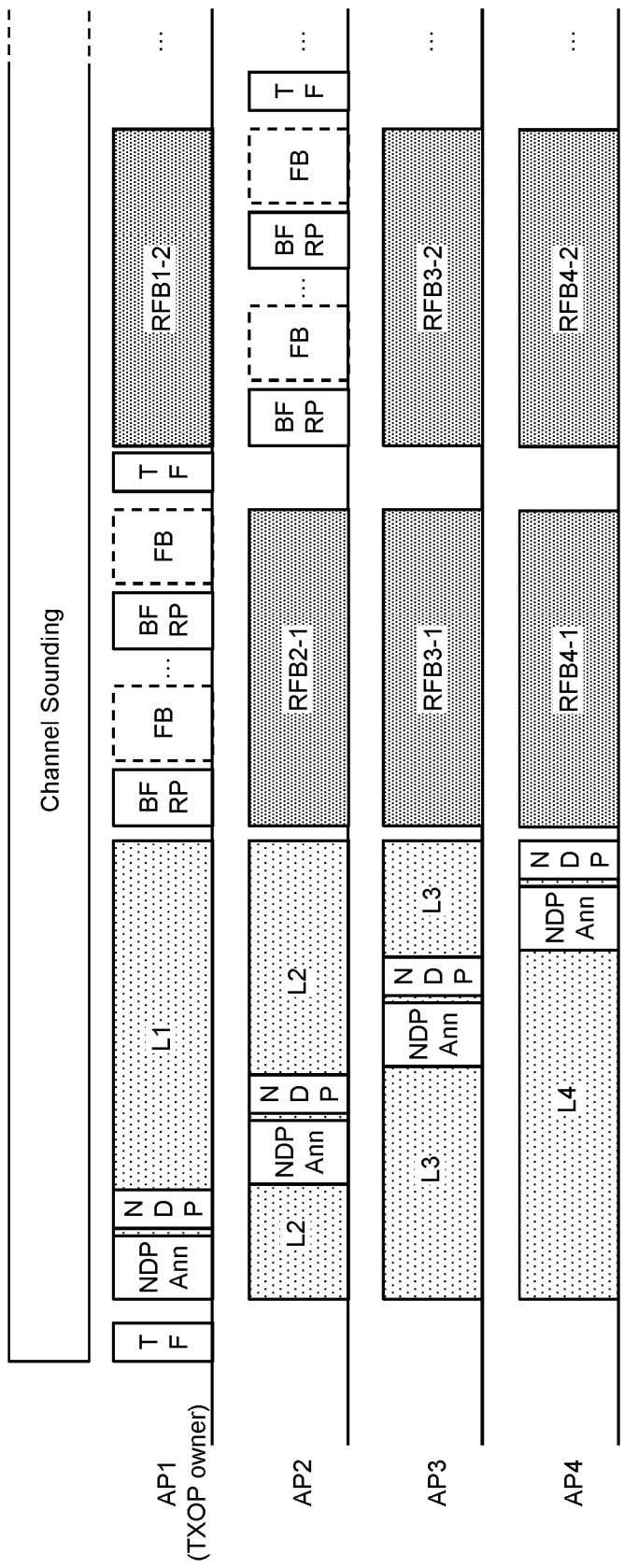
FIG. 15 illustrates an example of implementing the spatial channel sounding phase based on VHT (Very High Throughput) like channel sounding.

FIG. 15 illustrates an example of implementing the spatial channel sounding on the basis of a VHT like sounding mechanism. This sounding mechanism re-uses some features of the VHT sounding protocol and allows for providing the spatial channel sounding phase with a duration of a few milliseconds. As compared to the VHT sounding protocol, the VHT like sounding mechanism of the illustrated example assumes that the Multi-AP FB frame is broadcasted or multicasted to multiple APs. Alternatively, several unicast feedback frames, each addressed to a different AP, could be used.

In the example of FIG. 15, the spatial channel sounding phase begins with a trigger frame sent by the TXOP owner, in the illustrated example AP1. The APs participating in the sharing of the TXOP then start transmitting sounding signals, each at separate time intervals within the sounding phase. In particular, AP1 first sends an NDP Announcement followed by an NDP frame. After that, AP2 sends an NDP Announcement followed by an NDP frame. After that, AP3 sends an NDP Announcement followed by an NDP frame. After that, AP4 sends an NDP Announcement followed by an NDP frame. Based on the NDP frames transmitted by AP1, AP2, AP3, and AP4, the stations in BSS1 assess the spatial channels to AP1, AP2, AP3, and AP4, as denoted by learning phase L1. Similarly, based on the NDP frames transmitted by AP1, AP2, AP3, and AP4, the stations in BSS2 assess the spatial channels to AP1, AP2, AP3, and AP4, as denoted by learning phase L2, the stations in BSS3 assess the spatial channels to AP1, AP2, AP3, and AP4, as denoted by learning phase L3, and the stations in BSS4 assess the spatial channels to AP1, AP2, AP3, and AP4, as denoted by learning phase L4.

After the sounding phase, the APs sequentially trigger reporting of beamforming feedback by their respectively associated stations. This involves sending a BFRP to each station, which triggers sending of the Multi-AP beamforming feedback (denoted by FB) by the station. While the stations associated with AP1 send the Multi-AP beamforming feedback, AP1, AP2, AP3, and AP4 receive the Multi-AP beamforming feedback (in the case of AP2, AP3, and AP4 indicated by the blocks RFB2-1, RFB3-1, RFB4-1). Next, while the stations associated with AP2 send the Multi-AP beamforming feedback, AP1, AP2, AP3, and AP4 receive the Multi-AP beamforming feedback (in the case of AP1, AP3, and AP4 indicated by the blocks RFB1-2, RFB3-2, RFB4-2), then while the stations associated with AP3 send the Multi-AP beamforming feedback, AP1, AP2, AP3, and AP4 receive the Multi-AP beamforming feedback, and then while the stations associated with AP4 send the Multi-AP beamforming feedback, AP1, AP2, AP3, and AP4 receive the Multi-AP beamforming feedback.

Also in the example of FIG. 15, the Multi-AP beamforming feedback indicates the results of channel assessment for each station and is provided to each AP participating in the sharing of the TXOP.

Figure 16:
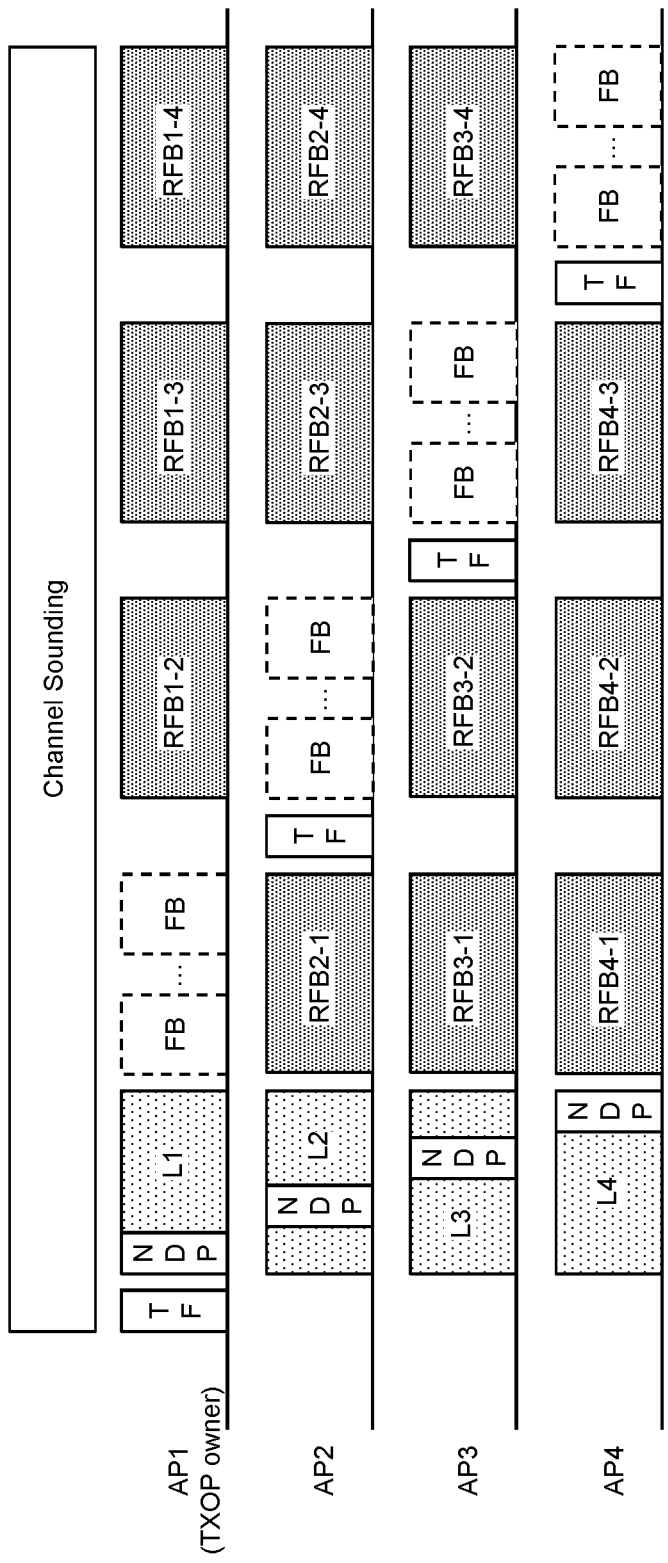
FIG. 16 illustrates a further example of implementing the spatial channel sounding phase based on VHT like channel sounding.
Figure 17:
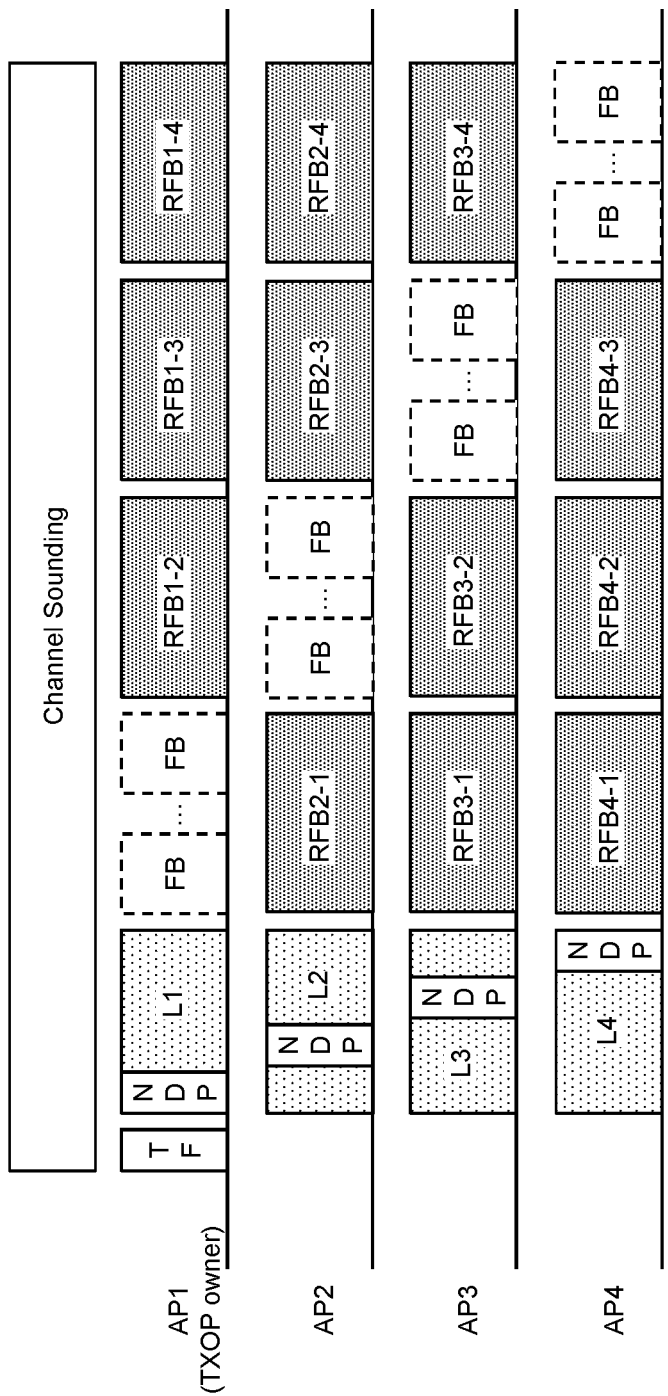
FIG. 17 illustrates a further example of implementing the spatial channel sounding phase based on VHT like channel sounding.

FIG. 16 illustrates a further example of implementing the spatial channel sounding on the basis of a VHT like sounding mechanism. The example of FIG. 16 is similar to that of FIG. 15, but does not require transmission of NDP Announcements or transmission BFRPs for initiating transmission of the Multi-AP beamforming feedback. Functionalities of the NDP Announcements may in this case be provided by the CTAS or CTLS messages and the Multi-AP beamforming feedback could be scheduled by the CTAS or CTLS messages. In addition or as alternative, the timing reporting by the individual stations may be controlled or through pre-defined interframe spacing times. In the example of FIG. 17, the duration of the feedback phase may be shortened. Further, since it is possible that not all the stations can hear all other stations, the example of FIG. 16 involves that transmission of the Multi-AP beamforming feedback by the stations in a BSS is triggered by trigger frame from the AP the of the BSS.

FIG. 17 illustrates a further example of implementing the spatial channel sounding on the basis of a VHT like sounding mechanism. The example of FIG. 17 is similar to that of FIG. 16, but does not involve sending of trigger frames for triggering transmission of the Multi-AP beamforming feedback, thereby allowing to further shorten the feedback phase.

Figure 18:
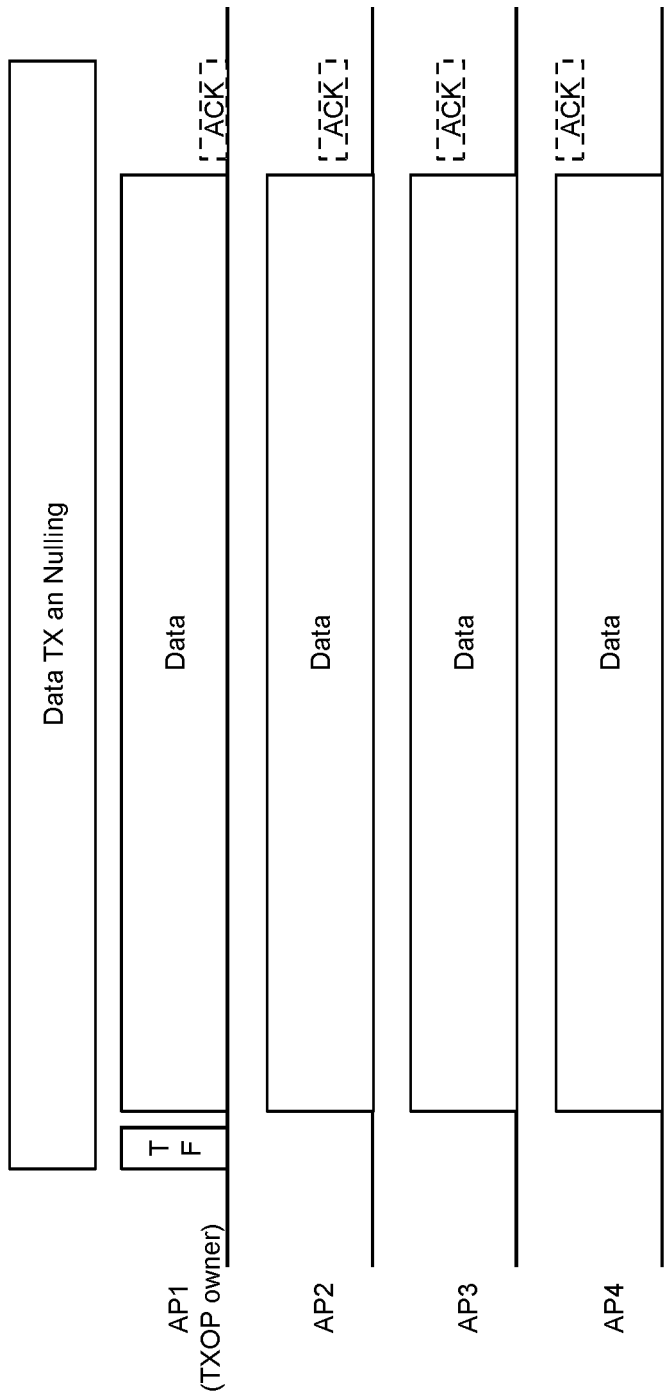
FIG. 18 illustrates a data transmission phase according to an embodiment.

FIG. 18 further illustrates the Data TX and Nulling Phase, i.e., the fourth phase of the TXOP sharing procedure. In this phase the participating APs transmit on their respective allocated resources in the TXOP, utilizing the precoders determined in the spatial channel sounding phase.

The example of FIG. 18 again assumes a scenario with four APs, denoted as AP1, AP2, AP3, and AP4. These APs may for example correspond to the APs 10 in the scenario of FIG. 3. In the example of FIG. 18, the TXOP owner, i.e., AP1, first sends a trigger frame for triggering the transmission of DL data by the APs participating in the sharing of the TXOP, in the illustrated example transmission of DL data by AP1, AP2, AP3, and AP4. As can be seen, all APs participating in the sharing of the TXOP can transmit at the same time, utilizing the full bandwidth of the carrier, e.g., of 80 MHz. After transmission of the DL data, the stations can acknowledge successful reception of the DL data by sending an ACK (acknowledgement) frame. The example of FIG. 18 assumes that the ACK frames are multiplexed by using OFDMA, i.e., different parts of the carrier bandwidth. However, it is noted that other way of multiplexing the ACK frames could be used as an alternative or in addition, e.g., TDMA and/or SDMA (Spatial Division Multiple Access).

In the above examples, some design decisions may be made in order to facilitate or support implementation of the TXOP sharing based on spatial multiplexing. For example, the TXOP sharing mechanism may be supplemented by a decision whether to utilize the TXOP sharing based on spatial multiplexing. This decision may for example consider the overhead introduced by the spatial channel sounding. If this overhead is larger than the remainder of the TXOP duration, it may be preferable to utilize another mechanism for TXOP sharing, e.g., CAP-OFDMA, or CAP-TDMA, or EDCA. Since the potential gain in the data transmission part as compared to CAP-OFDMA or CAP-TDMA is a factor corresponding to the number of APs sharing the TXOP, it could be decided to use CAP-SDMA is if the criterion (TXOP duration−TX indication and request time−schedule allocation time−spatial channel sounding time)/(TXOP duration−TX indication and request time−schedule allocation time)>1/(number of participating APs) is met.

While the above examples assumed that the Multi-AP beamforming feedback can be sent either multiplexed in space, such as in the HE like sounding, and or in time, such as in the VHT like sounding, it would also be possible to additionally or alternatively multiplex the Multi-AP beamforming feedback in the frequency domain, e.g., based on OFDMA.

In some scenarios, the information how many stations are assigned in each BSS, and optionally also the number of spatial streams per station, is used by each AP. This information be conveyed in the CTAS frame. For example, such information may be needed when using the HE like sounding mechanism of the example illustrated in FIG. 11. In the example of FIG. 12, such information may not be needed, because each AP sends individual trigger frames.

Further, it is noted that in practical implementations it may occur that the total degrees of freedom not perfectly sum up for each AP participating in the sharing of the TXOP. If this is the case, an assignment scheme may be utilized which first uses as many degrees of freedom as required for the transmission of data and uses the remaining degrees of freedom for the placing the beamforming nulls. Here, the beamforming nulls may be placed towards those stations in other BSSs who appear to have the best channels.

Further, it is noted that in the spatial channel sounding phase, only those stations that have data to receive may participate in the spatial channel sounding.

In some scenarios, the stations may reduce the amount of Multi-AP beamforming feedback, by not providing feedback to APs who appear to have a channel quality below some threshold. An example of such threshold could be 30 dB below the channel quality of the AP associated with the station.

Further, it is noted that the frames utilized in the spatial channel sounding are typically multicast or broadcast frames, thereby facilitating reception by various recipients.

In the illustrated concepts, investing a part of the time in the shared TXOP for spatial channel sounding may allow for achieving full spatial reuse of resources during the Data TX and Nulling phase. Simulations have shown that CAP-SDMA with VHT like sounding may provide an increased throughput of 195% as compared to conventional EDCA, and that CAP-SDMA with HE like sounding may provide an increased throughput of 265% as compared to conventional EDCA. These simulations were based on assuming an ESS with 4 BSS, 80 MHz carrier bandwidth. Further, it was assumed that all BSS have enough data to fill a full TXOP with 80 MHz and that there are enough antennas in all participating APs to transmit data within the BSS and place nulls to all receiving stations in the neighboring 3 BSSs, e.g., a scenario with two RX stations per BSS, each having two antennas, and 16 antennas per AP. For comparison, the simulations also considered OFDMA based sharing and TDMA based sharing of the TXOP, giving throughput values of 84% and 79%, respectively, as compared to conventional EDCA.

Figure 19:
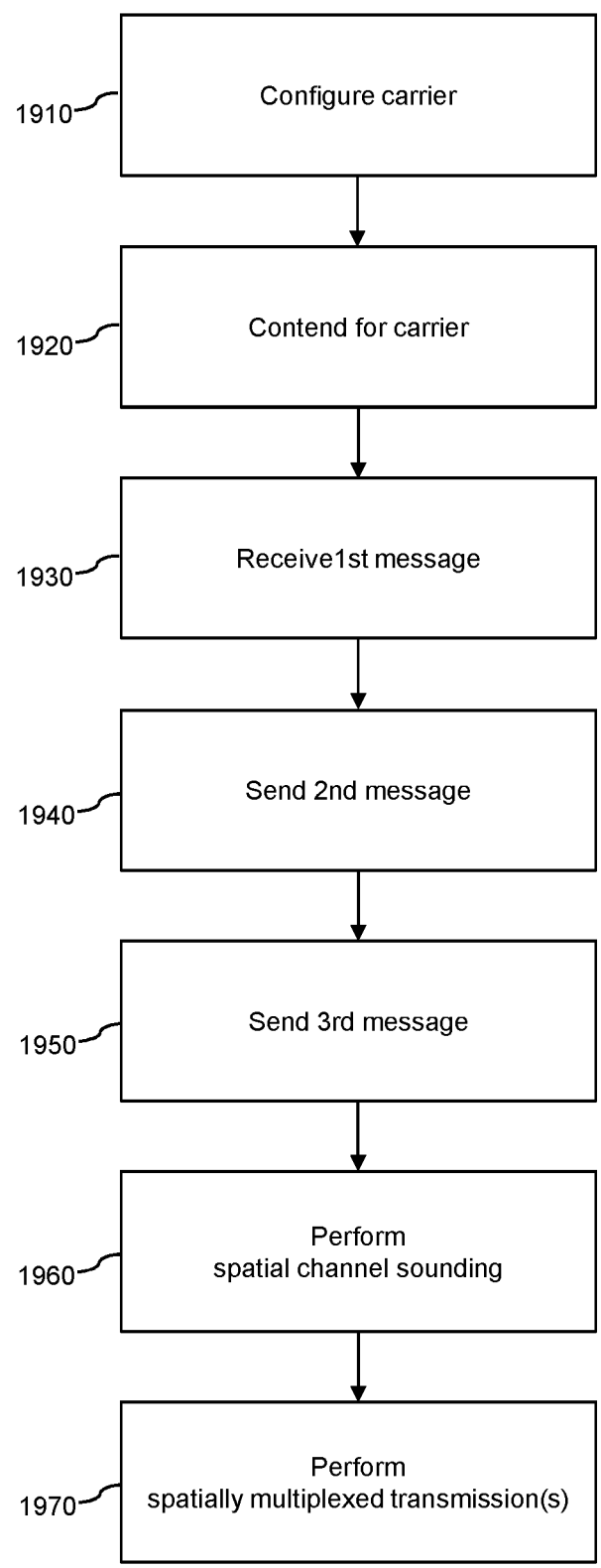
FIG. 19 shows a flowchart for schematically illustrating a method according to an embodiment.

FIG. 19 shows a flowchart for illustrating a method, which may be utilized for implementing the illustrated concepts. The method of FIG. 19 may be used for implementing the illustrated concepts in a network node, in particular an access point for a wireless communication system. The wireless communication system may be based on a wireless local area network, WLAN, technology, e.g., according to the IEEE 802.11 standards family. The access point may for example correspond to any of the above-mentioned APs 10, in particular to a TXOP owner, like AP1 in the above examples.

If a processor-based implementation of the access point is used, at least some of the steps of the method of FIG. 19 may be performed and/or controlled by one or more processors of the access point. Such access point may also include a memory storing program code for implementing at least some of the below described functionalities or steps of the method of FIG. 19.

At step 1910, the access point configures a carrier for communication with one or more wireless devices associated with the access point. The one or more wireless devices may for example correspond to the above-mentioned wireless devices 11. The one or more wireless devices may be stations in a BSS served by the access point.

At step 1920, the access point contends for access to the carrier. This may involve performing a CCA (Clear Channel Assessment) or LBT (Listen-Before-Talk) procedure to assess whether the carrier is occupied. In response to winning contention for access to the carrier, the access point reserves a TXOP on the carrier.

The access point then cooperates with one or more other access points of the wireless communication system by sharing the TXOP based on spatial multiplexing of wireless transmissions on the carrier. This may involve operations as further explained in connection with steps 1930, 1940, 1950, 1960, and/or 1970. The spatial multiplexing in the shared TXOP may be based on spatial channel sounding of wireless devices with respect to the access points sharing the TXOP, i.e., with respect to multiple access points.

At step 1930, the access point may receive a first message from at least one of the one or more other access points. The first message may have the purpose of initiating the sharing of the TXOP. The first message may include a request to participate in the sharing of the TXOP, and the access point may receive the first message in response to an invitation to participate in the sharing of the TXOP, such as the above-mentioned CTI message in the initial coordination phase. The above-mentioned CTR message is an example of such first message.

The first message may indicate whether the at least one of the one or more other access points supports spatial multiplexing, such as by the above-mentioned CAP-SDMA support flag. Alternatively or in addition, the first message may indicate a number of antenna elements available for supporting spatial multiplexing at the at least one of the one or more other access points. Alternatively or in addition, the first message may indicate a number of spatial streams required for transmission of data at the at least one of the one or more other access points. Alternatively or in addition, the first message may indicate a number of wireless devices associated with the at least one of the one or more other access points and requiring transmission of data in the shared TXOP. This information may be used in connection with information on a number of spatial streams required by each wireless device, which may be signalled in the first message or otherwise signalled, or may be a-priori known. Alternatively or in addition, the first message may indicate priority of data to be transmitted in the shared TXOP.

At step 1940, the access point may send a second message to at least one of the one or more other access points. The second message may have the purpose of coordinating the sharing of the TXOP. The above-mentioned CTAS message is an example of such second message.

The second message may indicate whether the at least one of the one or more other access points is to use spatial multiplexing in the shared TXOP.

Alternatively or in addition, the second message may indicate a number of spatial streams assigned to the at least one of the one or more other access points in the shared TXOP.

Alternatively or in addition, the second message may indicate a number of wireless devices associated with the at least one of the one or more other access points and allowed to be scheduled for transmission of data in the shared TXOP. This information may be used in connection with information on a number of spatial streams required by each wireless device, which may be signalled in the second message or otherwise signalled, or may be a-priori known.

Alternatively or in addition, the second message may indicate which wireless devices associated with the at least one of the one or more other access points are allowed to be scheduled for transmission of data in the shared TXOP.

Alternatively or in addition, the second message may indicate an allowed transmit power of wireless transmissions in the shared TXOP.

Alternatively or in addition, the second message may indicate time and/or frequency resources of the shared TXOP which are assigned to a spatial channel sounding phase of the at least one of the one or more other access points.

Alternatively or in addition, the second message may indicate a duration of a spatial channel sounding phase of the at least one of the one or more other access points.

Alternatively or in addition, the second message may indicate time and/or frequency resources of the shared TXOP which are assigned to wireless transmissions of data by the at least one of the one or more other access points.

At step 1950, the access point may send a third message to at least one of the one or more wireless devices associated with the access point. The third message may have the purpose of coordinating the sharing of the TXOP. The third message may configure the at least one of the one or more wireless devices to receive at least one spatially multiplexed wireless transmission on the carrier in the shared TXOP. The above-mentioned CTLS is an example of such third message. In some scenarios, the third message may also configure the at least one of the one or more wireless devices with respect to a spatial channel sounding procedure in the shared TXOP, e.g., by unique assignment of rows of a precoder matrix.

At step 1960, the access point may perform spatial channel sounding. This may involve spatial channel sounding of wireless devices with respect to the access points sharing the TXOP, i.e., with respect to multiple access points. For example, in a spatial channel sounding phase of the shared TXOP, the access point may send sounding signals and receive sounding reports from one or more wireless devices associated with the access points sharing the TXOP. Based on the received sounding reports, the access point may then determine a precoding matrix for spatially multiplexed wireless transmissions to at least one of the one or more wireless devices associated with the access point.

In some scenarios, the sounding reports may be received in multicast transmissions which are receivable by multiple access points sharing the TXOP. The sounding reports may also be multiplexed based on MU-MIMO.

At step 1970, the access point may perform spatially multiplexed transmissions in the shared TXOP. These spatially multiplexed transmissions may include one or more DL data transmissions from the access point to its associated wireless devices and/or UL transmissions from the wireless devices.

Figure 20:
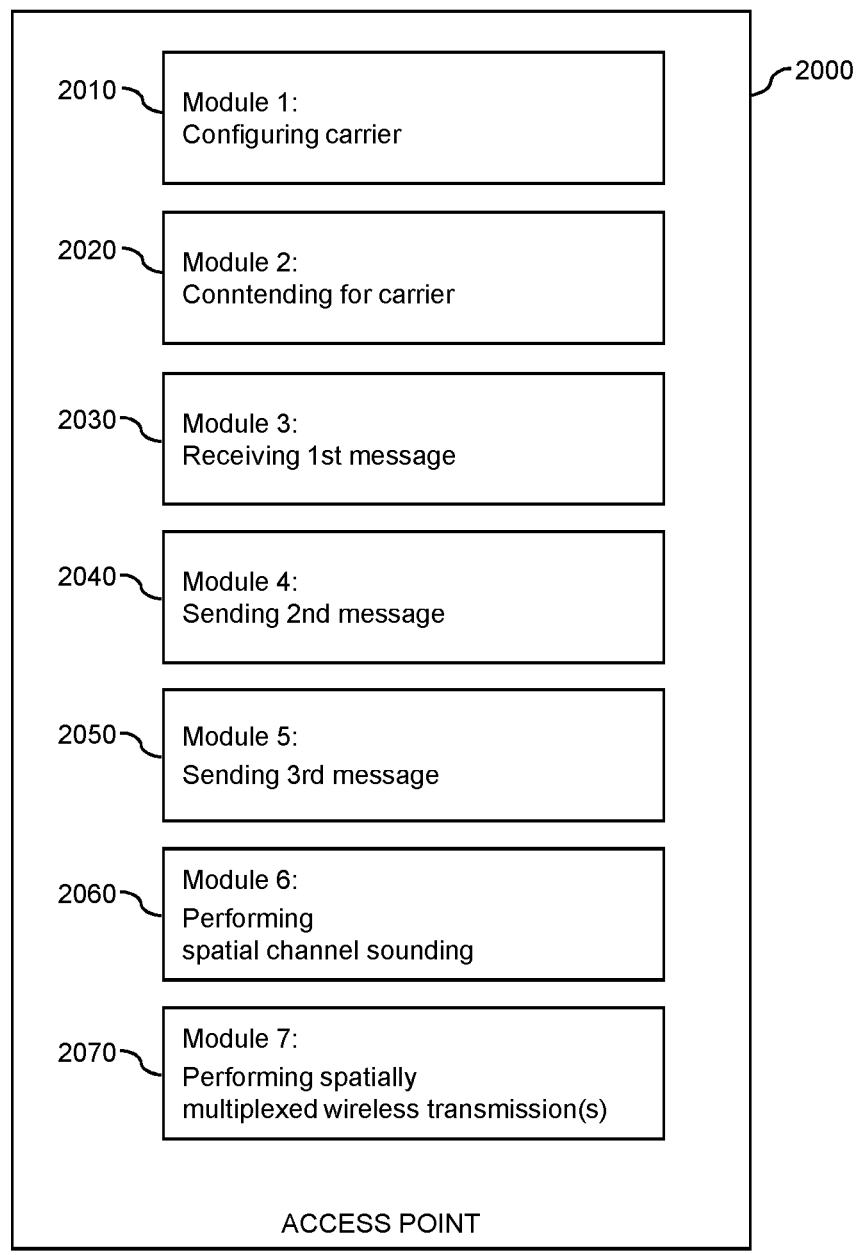
FIG. 20 shows a block diagram for schematically illustrating functionalities of an access point according to a further embodiment.

FIG. 20 shows a block diagram for illustrating functionalities of an access point 2000 which operates according to the method of FIG. 19. The access point 2000 may for example correspond to one of above-mentioned APs 10. As illustrated, the access point 2000 may be provided with a module 2010 configured to configure a carrier for communication with one or more wireless devices, such as explained in connection with step 1910. Further, the access point 2000 may optionally be provided with a module 2020 configured to contend for the carrier, such as explained in connection with step 1920. Further, the access point 2000 may optionally be provided with a module 2030 configured to receive a first message, such as explained in connection with step 1930. Further, the access point 2000 may optionally be provided with a module 2040 configured to send a second message, such as explained in connection with step 1940. Further, the access point 2000 may optionally be provided with a module 2050 configured to send a third message, such as explained in connection with step 1950. Further, the access point 2000 may optionally be provided with a module 2060 configured to perform spatial channel sounding, such as explained in connection with step 1960. Further, the access point 2000 may optionally be provided with a module 2070 configured to perform spatially multiplexed wireless transmissions, such as explained in connection with step 1970.

It is noted that the access point 2000 may include further modules for implementing other functionalities, such as known functionalities of a WLAN AP. Further, it is noted that the modules of the access point 2000 do not necessarily represent a hardware structure of the access point 2000, but may also correspond to functional elements, e.g., implemented by hardware, software, or a combination thereof.

Figure 21:
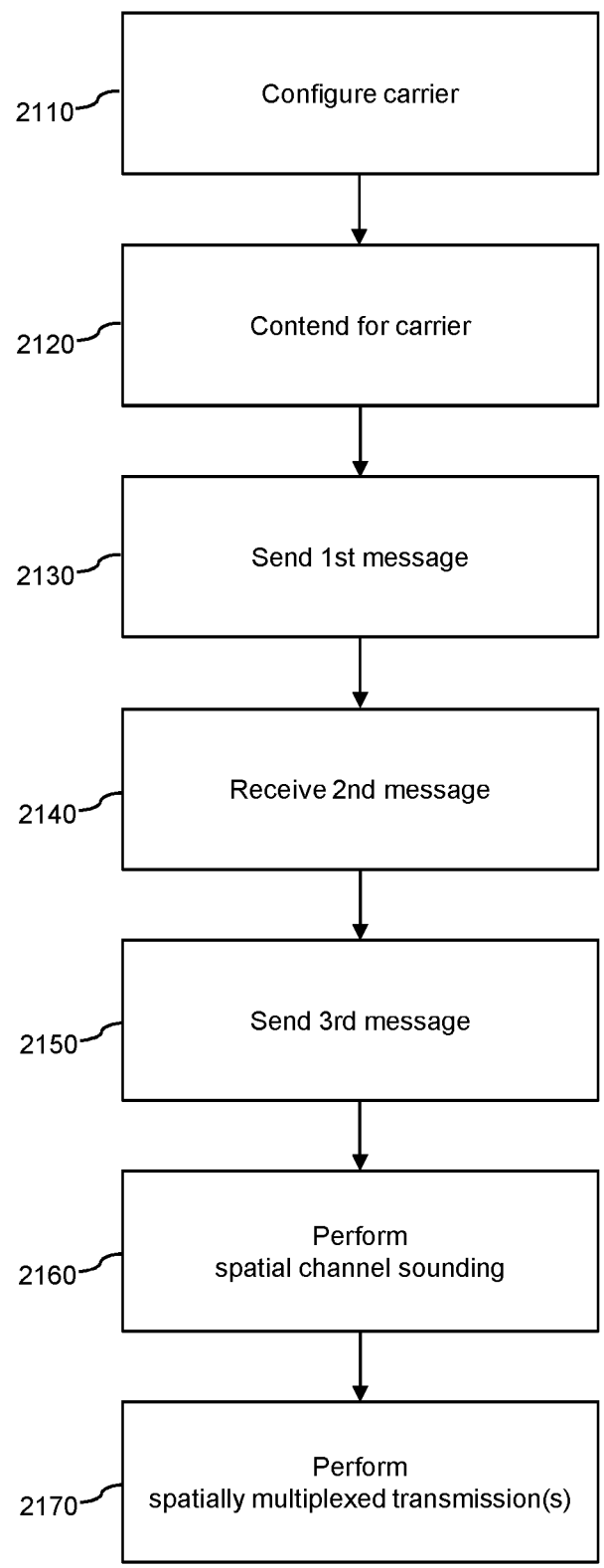
FIG. 21 shows a flowchart for schematically illustrating a further method according to an embodiment.

FIG. 21 shows a flowchart for illustrating a method, which may be utilized for implementing the illustrated concepts. The method of FIG. 21 may be used for implementing the illustrated concepts in a network node, in particular an access point for a wireless communication system. The wireless communication system may be based on a wireless local area network, WLAN, technology, e.g., according to the IEEE 802.11 standards family. The access point may for example correspond to any of the above-mentioned APs 10, in particular to a participating AP, like AP2, AP3, or AP4 in the above examples.

If a processor-based implementation of the access point is used, at least some of the steps of the method of FIG. 21 may be performed and/or controlled by one or more processors of the access point. Such access point may also include a memory storing program code for implementing at least some of the below described functionalities or steps of the method of FIG. 21.

At step 2110, the access point configures a carrier for communication with one or more wireless devices associated with the access point. The one or more wireless devices may for example correspond to the above-mentioned wireless devices 11. The one or more wireless devices may be stations in a BSS served by the access point.

At step 2120, the access point may contend for access to the carrier. This may involve performing a CCA or LBT procedure to assess whether the carrier is occupied. In response to another access point winning contention for access to the carrier, like AP1 in the above examples, the other access point reserves a TXOP on the carrier.

The access point then cooperates at least with the access point winning the contention, but optionally also with one or more further access points, by sharing the TXOP based on spatial multiplexing of wireless transmissions on the carrier. This may involve operations as further explained in connection with steps 2130, 2140, 2150, 2160, and/or 2170. The spatial multiplexing in the shared TXOP may be based on spatial channel sounding of wireless devices with respect to the access points sharing the TXOP, i.e., with respect to multiple access points.

At step 2130, the access point may send a first message to the access point winning the contention. The first message may have the purpose of initiating the sharing of the TXOP. The first message may include a request to participate in the sharing of the TXOP, and the access point may send the first message in response to an invitation to participate in the sharing of the TXOP, such as the above-mentioned CTI message in the initial coordination phase. The above-mentioned CTR message is an example of such first message.

The first message may indicate whether the access point supports spatial multiplexing, such as by the above-mentioned CAP-SDMA support flag. Alternatively or in addition, the first message may indicate a number of antenna elements available for supporting spatial multiplexing at the access point. Alternatively or in addition, the first message may indicate a number of spatial streams required for transmission of data at the access point. Alternatively or in addition, the first message may indicate a number of wireless devices associated with the access point and requiring transmission of data in the shared TXOP. This information may be used in connection with information on a number of spatial streams required by each wireless device, which may be signalled in the first message or otherwise signalled, or may be a-priori known. Alternatively or in addition, the first message may indicate priority of data to be transmitted in the shared TXOP.

At step 2140, the access point may receive a second message from the access point winning the contention. The second message may have the purpose of coordinating the sharing of the TXOP. The above-mentioned CTAS message is an example of such second message.

The second message may indicate whether the access point is to use spatial multiplexing in the shared TXOP.

Alternatively or in addition, the second message may indicate a number of spatial streams assigned to the access point in the shared TXOP.

Alternatively or in addition, the second message may indicate a number of wireless devices associated with the access point and allowed to be scheduled for transmission of data in the shared TXOP. This information may be used in connection with information on a number of spatial streams required by each wireless device, which may be signalled in the second message or otherwise signalled, or may be a-priori known.

Alternatively or in addition, the second message may indicate which wireless devices associated with the access point are allowed to be scheduled for transmission of data in the shared TXOP.

Alternatively or in addition, the second message may indicate an allowed transmit power of wireless transmissions in the shared TXOP.

Alternatively or in addition, the second message may indicate time and/or frequency resources of the shared TXOP which are assigned to a spatial channel sounding phase of the access point.

Alternatively or in addition, the second message may indicate a duration of a spatial channel sounding phase of the access point.

Alternatively or in addition, the second message may indicate time and/or frequency resources of the shared TXOP which are assigned to wireless transmissions of data by the access point.

At step 2150, the access point may send a third message to at least one of the one or more wireless devices associated with the access point. The third message may have the purpose of coordinating the sharing of the TXOP. The third message may configure the at least one of the one or more wireless devices to receive at least one spatially multiplexed wireless transmission in the shared TXOP on the carrier. The above-mentioned CTLS is an example of such third message. In some scenarios, the third message may also configure the at least one of the one or more wireless devices with respect to a spatial channel sounding procedure in the shared TXOP, e.g., by unique assignment of rows of a precoder matrix.

At step 2160, the access point may perform spatial channel sounding. This may involve spatial channel sounding of wireless devices with respect to the access points sharing the TXOP, i.e., with respect to multiple access points. For example, in a spatial channel sounding phase of the shared TXOP, the access point may send sounding signals and receive sounding reports from one or more wireless devices associated with the access points sharing the TXOP. Based on the received sounding reports, the access point may then determine a precoding matrix for spatially multiplexed wireless transmissions to at least one of the one or more wireless devices associated with the access point.

In some scenarios, the sounding reports may be received in multicast transmissions which are receivable by multiple access points sharing the TXOP. The sounding reports may also be multiplexed based on MU-MIMO.

At step 2170, the access point may perform spatially multiplexed transmissions in the shared TXOP. These spatially multiplexed transmissions may include one or more DL data transmissions from the access point to its associated wireless devices and/or UL transmissions from the wireless devices.

Figure 22:
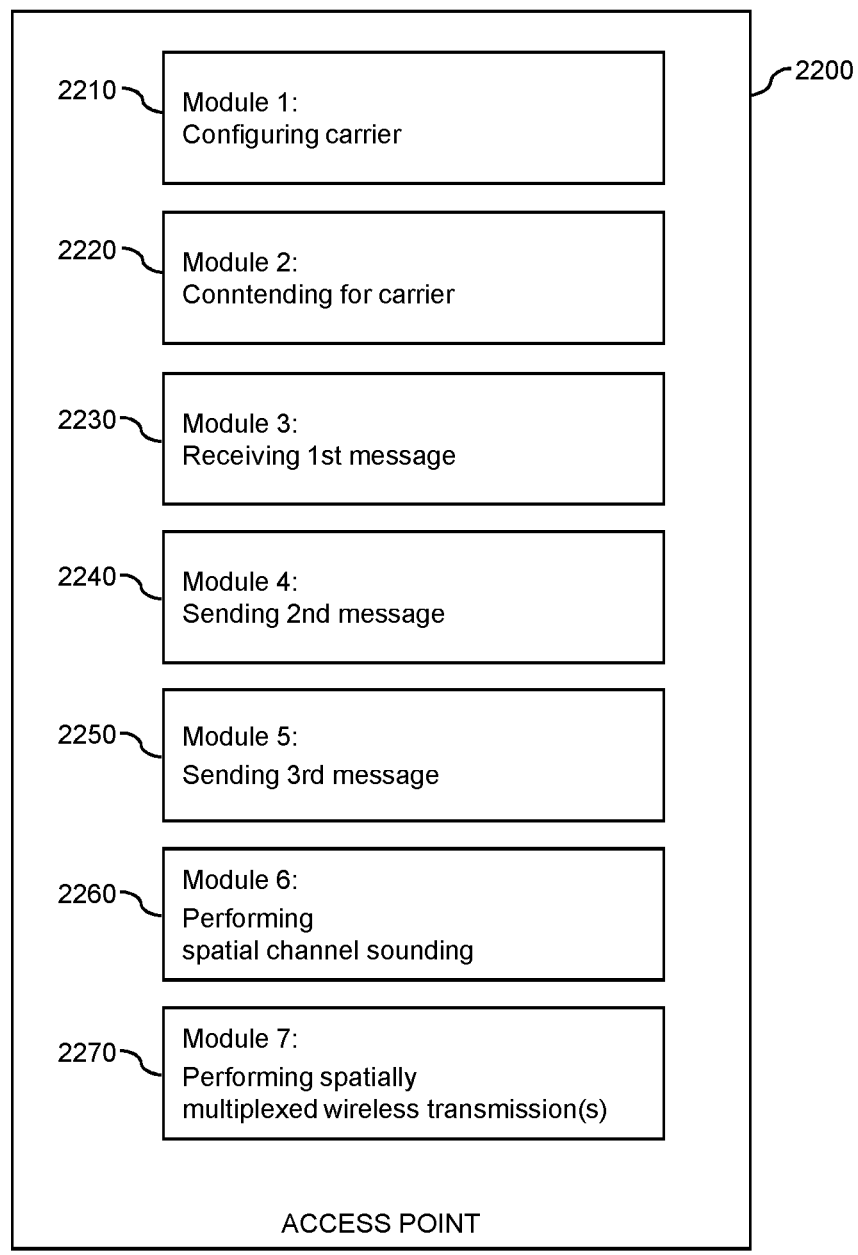
FIG. 22 shows a block diagram for schematically illustrating further functionalities of an access point according to a further embodiment.

FIG. 22 shows a block diagram for illustrating functionalities of an access point 2200 which operates according to the method of FIG. 21. The access point 2200 may for example correspond to one of above-mentioned APs 10. As illustrated, the access point 2200 may be provided with a module 2210 configured to configure a carrier for communication with one or more wireless devices, such as explained in connection with step 2110. Further, the access point 2200 may optionally be provided with a module 2220 configured to contend for the carrier, such as explained in connection with step 2120. Further, the access point 2200 may optionally be provided with a module 2230 configured to send a first message, such as explained in connection with step 2130. Further, the access point 2200 may optionally be provided with a module 2240 configured to receive a second message, such as explained in connection with step 2140. Further, the access point 2200 may optionally be provided with a module 2250 configured to send a third message, such as explained in connection with step 2150. Further, the access point 2200 may optionally be provided with a module 2260 configured to perform spatial channel sounding, such as explained in connection with step 2160. Further, the access point 2200 may optionally be provided with a module 2270 configured to perform spatially multiplexed wireless transmissions, such as explained in connection with step 2170.

It is noted that the access point 2200 may include further modules for implementing other functionalities, such as known functionalities of a WLAN AP. Further, it is noted that the modules of the access point 2200 do not necessarily represent a hardware structure of the access point 2200, but may also correspond to functional elements, e.g., implemented by hardware, software, or a combination thereof.

Figure 23:
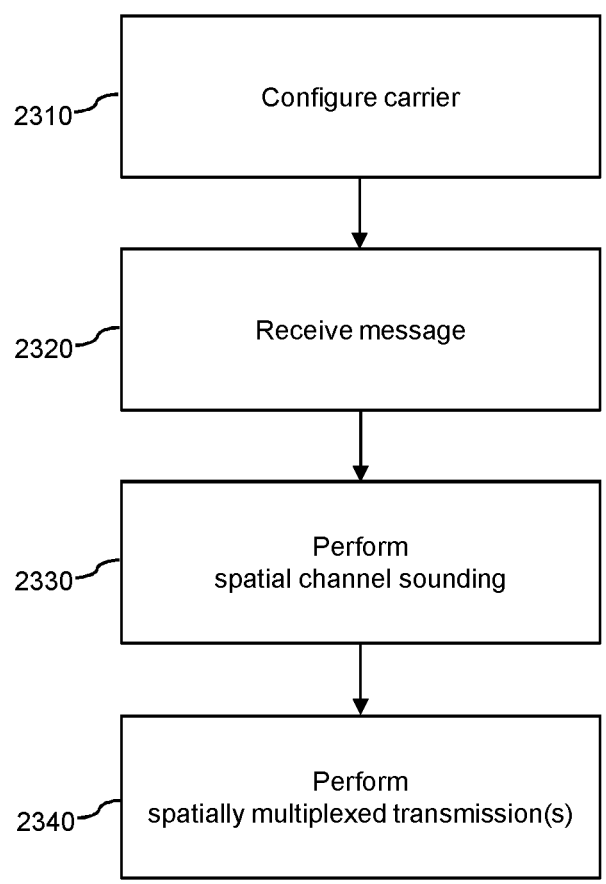
FIG. 23 shows a flowchart for schematically illustrating a further method according to an embodiment.

FIG. 23 shows a flowchart for illustrating a method, which may be utilized for implementing the illustrated concepts. The method of FIG. 23 may be used for implementing the illustrated concepts in a wireless device for operation in a wireless communication system. The wireless communication system may be based on a wireless local area network, WLAN, technology, e.g., according to the IEEE 802.11 standards family. The wireless device may for example correspond to any of the above-mentioned stations 11.

If a processor-based implementation of the wireless device is used, at least some of the steps of the method of FIG. 23 may be performed and/or controlled by one or more processors of the wireless device. Such wireless device may also include a memory storing program code for implementing at least some of the below described functionalities or steps of the method of FIG. 23.

At step 2310, the wireless device configures a carrier for communication with an access point of the wireless communication system. The access point may for example correspond to one of the above-mentioned APs 10. The wireless device may be a stations in a BSS served by the access point. The access point is assumed to cooperate with one or more other access points by sharing a TXOP, reserved on the carrier, based on spatial multiplexing of wireless transmissions on the carrier. This may involve operations as further explained in connection with steps 2320, 2330, and/or 2340. The spatial multiplexing in the shared TXOP may be based on spatial channel sounding of wireless devices with respect to the access points sharing the TXOP, i.e., with respect to multiple access points.

At step 2330, the wireless device may receive a message from the access point. The message may have the purpose of coordinating the sharing of the TXOP. The message may configure the wireless device to receive at least one spatially multiplexed wireless transmission on the carrier in the shared TXOP. The above-mentioned CTLS is an example of such message. In some scenarios, the message may also configure the wireless device with respect to a spatial channel sounding procedure in the shared TXOP, e.g., by unique assignment of rows of a precoder matrix.

At step 2340, the wireless device may perform spatial channel sounding. This may involve spatial channel sounding with respect to the access points sharing the TXOP, i.e., with respect to multiple access points. For example, in a spatial channel sounding phase of the shared TXOP, the wireless device may receive sounding signals and, based on the received sounding signals, send sound reports to the access points sharing the TXOP. The sounding reports may include a precoding matrix for spatially multiplexed wireless transmissions or may at least enable determination of such precoding matrix at the access points.

In some scenarios, the sounding reports may be sent in multicast transmissions which are receivable by multiple access points sharing the TXOP. The sounding reports may also be multiplexed based on MU-MIMO.

At step 2340, the wireless device may perform spatially multiplexed transmissions in the shared TXOP. These spatially multiplexed transmissions may include one or more DL data transmissions from the access point to the wireless device and/or UL transmissions from the wireless device to the access point.

Figure 24:
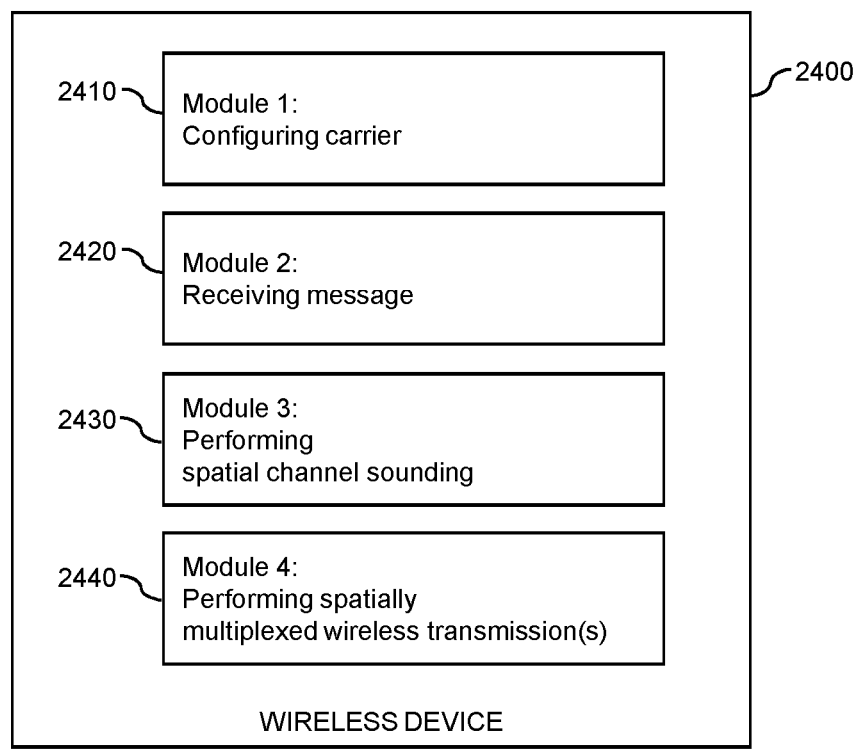
FIG. 24 shows a block diagram for schematically illustrating functionalities of a wireless device according to an embodiment.

FIG. 24 shows a block diagram for illustrating functionalities of a wireless device 2400 which operates according to the method of FIG. 23. The wireless device 2400 may for example correspond to one of above-mentioned stations 11. As illustrated, the wireless device 2400 may be provided with a module 2410 configured to configure a carrier for communication with an access point, such as explained in connection with step 2310. Further, the wireless device 2400 may optionally be provided with a module 2420 configured to receive a message for coordinating sharing of a TXOP, such as explained in connection with step 2330. Further, the wireless device 2400 may optionally be provided with a module 2430 configured to perform a spatial sounding procedure, such as explained in connection with step 2330. Further, the wireless device 2400 may be provided with a module 2440 configured to perform one or more spatially multiplexed transmissions, such as explained in connection with step 2340.

It is noted that the wireless device 2400 may include further modules for implementing other functionalities, such as known functionalities of a WLAN station. Further, it is noted that the modules of the wireless device 2400 do not necessarily represent a hardware structure of the wireless device 2400, but may also correspond to functional elements, e.g., implemented by hardware, software, or a combination thereof.

It is noted that the functionalities as described in connection with FIGS. 19 to 24 could also be combined. For example, the same access point could operate either according to the method of FIG. 19 or according to the method of FIG. 21, depending on whether the access point wins the contention. Further, the with FIGS. 19 to 22 could also be combined in a system including an access point operating according to the method of FIG. 19 and one or more access points operating according to the method of FIG. 21. Further, such system could include one or more wireless devices operating according to the method of FIG. 23.

Figure 25:
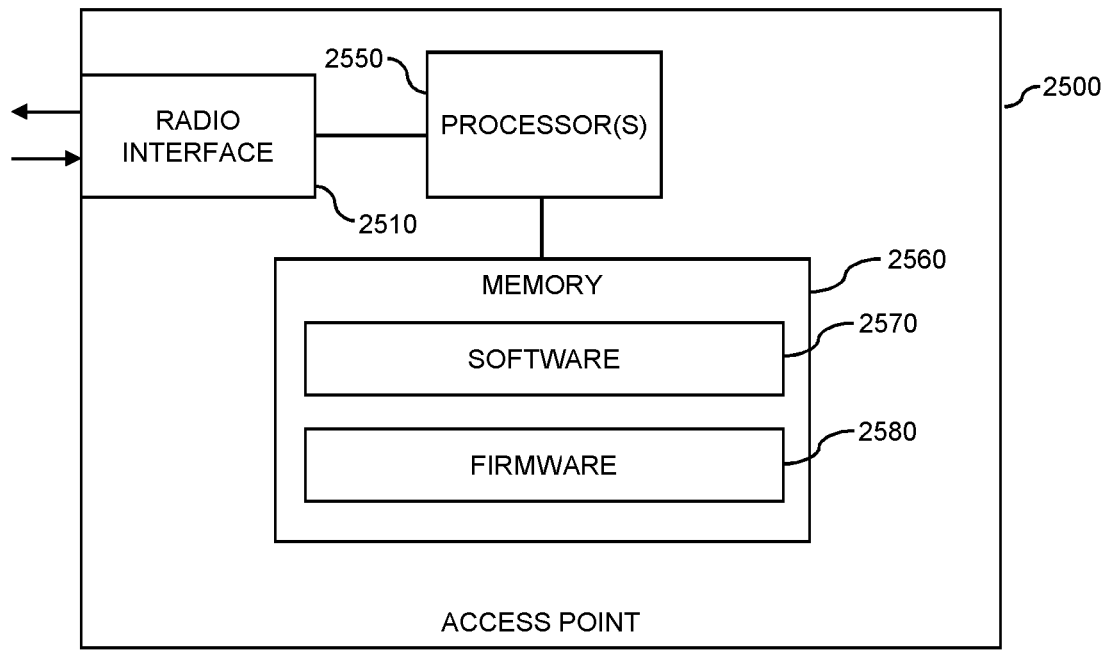
FIG. 25 schematically illustrates structures of an access point according to an embodiment.

FIG. 25 illustrates a processor-based implementation of an access point 2500 which may be used for implementing the above-described concepts. For example, the structures as illustrated in FIG. 25 may be used for implementing the concepts in any of the above-mentioned access points 10.

As illustrated, the access point 2500 includes one or more radio interfaces 2510. The radio interface(s) 2510 may for example be based on a WLAN technology, e.g., according to an IEEE 802.11 family standard. However, other wireless technologies could be supported as well, e.g., the LTE technology or the NR technology. The radio interface(s) 2510 may be based on multiple antennas of the access point 2500, and in particular support beamformed multi-antenna port transmission.

Further, the access point 2500 may include one or more processors 2550 coupled to the radio interface(s) 2510 and a memory 2560 coupled to the processor(s) 2550. By way of example, the radio interface(s) 2510, the processor(s) 2550, and the memory 2560 could be coupled by one or more internal bus systems of the access point 2500. The memory 2560 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 2560 may include software 2570 and/or firmware 2580. The memory 2560 may include suitably configured program code to be executed by the processor(s) 2550 so as to implement the above-described functionalities for controlling wireless transmissions, such as explained in connection with FIGS. 19 to 22.

It is to be understood that the structures as illustrated in FIG. 25 are merely schematic and that the access point 2500 may actually include further components which, for the sake of clarity, have not been illustrated, e.g., further interfaces or further processors. Also, it is to be understood that the memory 2560 may include further program code for implementing known functionalities of an access point. According to some embodiments, also a computer program may be provided for implementing functionalities of the access point 2500, e.g., in the form of a physical medium storing the program code and/or other data to be stored in the memory 2560 or by making the program code available for download or by streaming.

Figure 26:
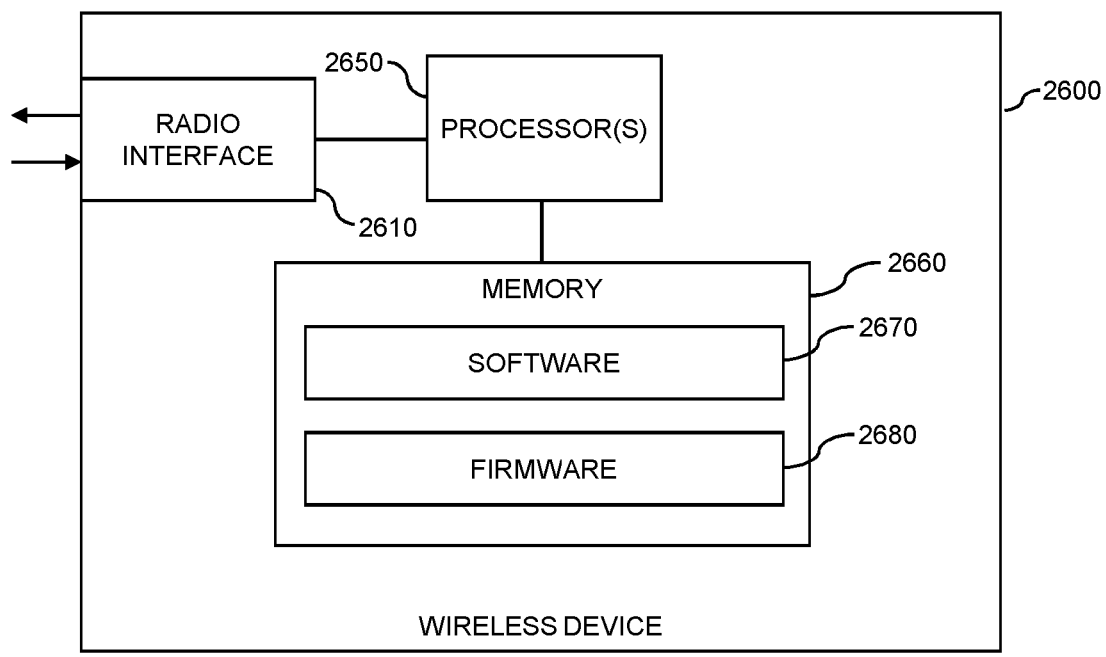
FIG. 26 schematically illustrates structures of a wireless device according to an embodiment.

FIG. 26 illustrates a processor-based implementation of a wireless device 2600 which may be used for implementing the above-described concepts. For example, the structures as illustrated in FIG. 26 may be used for implementing the concepts in any of the above-mentioned stations 11.

As illustrated, the wireless device 2600 includes one or more radio interfaces 2610. The radio interface(s) 2610 may for example be based on a WLAN technology, e.g., according to an IEEE 802.11 family standard. However, other wireless technologies could be supported as well, e.g., the LTE technology or the NR technology. The radio interface(s) 2610 may be based on multiple antennas of the wireless device 2600, and in particular support beamformed multi-antenna port transmission.

Further, the wireless device 2600 may include one or more processors 2650 coupled to the radio interface(s) 2610 and a memory 2660 coupled to the processor(s) 2650. By way of example, the radio interface(s) 2610, the processor(s) 2650, and the memory 2660 could be coupled by one or more internal bus systems of the wireless device 2600. The memory 2660 may include a ROM, e.g., a flash ROM, a RAM, e.g., a DRAM or SRAM, a mass storage, e.g., a hard disk or solid state disk, or the like. As illustrated, the memory 2660 may include software 2670 and/or firmware 2680. The memory 2660 may include suitably configured program code to be executed by the processor(s) 2650 so as to implement the above-described functionalities for controlling wireless transmissions, such as explained in connection with FIGS. 23 and 24.

It is to be understood that the structures as illustrated in FIG. 26 are merely schematic and that the wireless device 2600 may actually include further components which, for the sake of clarity, have not been illustrated, e.g., further interfaces or further processors. Also, it is to be understood that the memory 2660 may include further program code for implementing known functionalities of WLAN station. According to some embodiments, also a computer program may be provided for implementing functionalities of the wireless device 2600, e.g., in the form of a physical medium storing the program code and/or other data to be stored in the memory 2660 or by making the program code available for download or by streaming.

As can be seen, the concepts as described above may be used for efficiently controlling contention-based wireless transmissions, in particular with increasing data throughput in TXOP sharing.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and stations. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided in the present disclosure include:

Embodiment 1

A method of controlling wireless transmissions in a wireless communication system, the method comprising:
the access point (10; 2000; 2500) of the wireless communication system configuring a carrier for communication with one or more wireless devices (11; 2400; 2600) associated with the access point (10; 2000; 2500);
the access point (10; 2000; 2500) contending for access to the carrier;
in response to winning contention for access to the carrier, the access point (10; 2000; 2500) reserving a transmission opportunity on the carrier; and
the access point (10; 2000; 2500) cooperating with one or more other access points (10; 2200; 2500) of the wireless communication system by sharing the transmission opportunity based on spatial multiplexing of wireless transmissions on the carrier.

Embodiment 2

The method according to embodiment 1,
the access point (10; 2000; 2500) receiving a first message for initiating the sharing of the transmission opportunity from at least one of the one or more other access points (10; 2200; 2500).

Embodiment 3

The method according to embodiment 2,
wherein the first message indicates whether the at least one of the one or more other access points (10; 2200; 2500) supports spatial multiplexing.

Embodiment 4

The method according to embodiment 2 or 3,
wherein the first message indicates a number of antenna elements available for supporting spatial multiplexing at the at least one of the one or more other access points (10; 2200; 2500).

Embodiment 5

The method according to any one of embodiments 2 to 4,
wherein the first message indicates a number of spatial streams required for transmission of data at the at least one of the one or more other access points (10; 2200; 2500).

Embodiment 6

The method according to any one of embodiments 2 to 5,
wherein the first message indicates a number of wireless devices (11; 2400; 2600) associated with the at least one of the one or more other access points (10; 2200; 2500) and requiring transmission of data in the shared transmission opportunity.

Embodiment 7

The method according to any one of embodiments 2 to 6,
wherein the first message indicates priority of data to be transmitted in the shared transmission opportunity.

Embodiment 8

The method according to any one of embodiments 2 to 7,
wherein the first message comprises a request to participate in the sharing of the transmission opportunity.

Embodiment 9

The method according to any one of embodiments 2 to 8,
wherein the access point (10; 2000; 2500) receives the first message in response to an invitation to participate in the sharing of the transmission opportunity.

Embodiment 10

The method according to any one of embodiments 1 to 7, comprising:
the access point (10; 2000; 2500) sending a second message for coordinating the sharing of the transmission opportunity to at least one of the one or more other access points (10; 2200; 2500).

Embodiment 11

The method according to embodiment 10,
wherein the second message indicates whether the at least one of the one or more other access points (10; 2200; 2500) is to use spatial multiplexing in the shared transmission opportunity.

Embodiment 12

The method according to embodiment 10 or 11,
wherein the second message indicates a number of spatial streams assigned to the at least one of the one or more other access points (10; 2200; 2500) in the shared transmission opportunity.

Embodiment 13

The method according to any one of embodiments 10 to 12,
wherein the second message indicates a number of wireless devices (11; 2400; 2600) associated with the at least one of the one or more other access points (10; 2200; 2500) and allowed to be scheduled for transmission of data in the shared transmission opportunity.

Embodiment 14

The method according to any one of embodiments 10 to 13,
wherein the second message indicates which wireless devices (11; 2400; 2600) associated with the at least one of the one or more other access points (10; 2200; 2500) are allowed to be scheduled for transmission of data in the shared transmission opportunity.

Embodiment 15

The method according to any one of embodiments 10 to 14,
wherein the second message indicates an allowed transmit power of wireless transmissions in the shared transmission opportunity.

Embodiment 16

The method according to any one of embodiments 10 to 15,
wherein the second message indicates time and/or frequency resources of the shared transmission opportunity which are assigned to a spatial channel sounding phase of the at least one of the one or more other access points (10; 2200; 2500).

Embodiment 17

The method according to any one of embodiments 10 to 16,
wherein the second message indicates a duration of a spatial channel sounding phase of the at least one of the one or more other access points (10; 2200; 2500).

Embodiment 18

The method according to any one of embodiments 10 to 17,
wherein the second message indicates time and/or frequency resources of the shared transmission opportunity which are assigned to wireless transmissions of data by the at least one of the one or more other access points (10; 2200; 2500).

Embodiment 19

The method according to any one of embodiments 1 to 18, comprising:
the access point (10; 2000; 2500) sending a third message for coordinating the sharing of the transmission opportunity to at least one of the one or more wireless devices (11; 2400; 2600) associated with the access point (10; 2000; 2500), the third message configuring the at least one of the one or more wireless devices (11; 2400; 2600) to receive at least one spatially multiplexed wireless transmission on the carrier in the shared transmission opportunity.

Embodiment 20

The method according to embodiment 19,
wherein the third message configures the at least one of the one or more wireless devices (11; 2400; 2600) with respect to a spatial channel sounding procedure in the shared transmission opportunity.

Embodiment 21

The method according to any one of embodiments 1 to 20,
wherein the spatial multiplexing in the shared transmission opportunity is based on spatial channel sounding of wireless devices (11; 2400; 2600) with respect to the access points (10; 2000; 2200; 2500) sharing the transmission opportunity.

Embodiment 22

The method according to any one of embodiments 1 to 21, comprising:
in a spatial channel sounding phase of the shared transmission opportunity, the access point (10; 2000; 2500) sending sounding signals and receiving sounding reports from one or more wireless devices (11; 2400; 2600) associated with the access points (10; 2000; 2200; 2500) sharing the transmission opportunity; and
based on the received sounding reports, the access point (10; 2000; 2500) determining a precoding matrix for spatially multiplexed wireless transmissions to at least one of the one or more wireless devices (11; 2400; 2600) associated with the access point (10; 2000; 2500).

Embodiment 23

The method according to embodiment 22,
wherein the sounding reports are received in multicast transmissions which are receivable by multiple access points (10; 2000; 2200; 2500) sharing the transmission opportunity,

Embodiment 24

The method according to any one of embodiments 1 to 24,
wherein the wireless communication system is based on a Wireless Local Area Network technology according to the IEEE 802.11 standards family.

Embodiment 25

A method of controlling wireless transmissions in a wireless communication system, the method comprising:
an access point (10; 2200; 2500) of the wireless communication system configuring a carrier for communication with one or more wireless devices (11; 2400; 2600) associated with the access point (10; 2200; 2500);
the access point (10; 2200; 2500) contending for access to the carrier;
in response to another access point winning contention for access to the carrier, the access point cooperating at least with the access point (10; 2000; 2500) winning the contention by sharing, based on spatial multiplexing of wireless transmissions on the carrier, a transmission opportunity reserved on the carrier by the access point (10; 2000; 2500) winning the contention.

Embodiment 26

The method according to embodiment 25,
the access point (10; 2200; 2500) sending a first message for initiating the sharing of the transmission opportunity to the access point (10; 2000; 2500) winning the contention.

Embodiment 27

The method according to embodiment 26,
wherein the first message indicates whether the access point (10; 2200; 2500) supports spatial multiplexing.

Embodiment 28

The method according to embodiment 26 or 27,
wherein the first message indicates a number of antenna elements available for supporting spatial multiplexing at the access point (10; 2200; 2500).

Embodiment 29

The method according to any one of embodiments 26 to 28,
wherein the first message indicates a number of spatial streams required for transmission of data at the access point (10; 2200; 2500).

Embodiment 30

The method according to any one of embodiments 26 to 29,
wherein the first message indicates a number of wireless devices (11; 2400; 2600) associated with the access point (10; 2200; 2500) and requiring transmission of data in the shared transmission opportunity.

Embodiment 31

The method according to any one of embodiments 26 to 30,
wherein the first message indicates priority of data to be transmitted in the shared transmission opportunity.

Embodiment 32

The method according to any one of embodiments 26 to 31,
wherein the first message comprises a request to participate in the sharing of the transmission opportunity.

Embodiment 33

The method according to any one of embodiments 26 to 32,
wherein the access point (10; 2200; 2500) sends the first message in response to an invitation to participate in the sharing of the transmission opportunity.

Embodiment 34

The method according to any one of embodiments 26 to 33, comprising:
the access point (10; 2200; 2500) receiving a second message for coordinating the sharing of the transmission opportunity from the access point (10; 2000; 2500) winning the contention.

Embodiment 35

The method according to embodiment 34,
wherein the second message indicates whether the access point (10; 2200; 2500) is to use spatial multiplexing in the shared transmission opportunity.

Embodiment 36

The method according to embodiment 34 or 35,
wherein the second message indicates a number of spatial streams assigned to the access point (10; 2200; 2500) in the shared transmission opportunity.

Embodiment 37

The method according to any one of embodiments 34 to 36,
wherein the second message indicates a number of the wireless devices (11; 2400; 2600) associated with the access point (10; 2200; 2500) which are allowed to be scheduled for transmission of data in the shared transmission opportunity.

Embodiment 38

The method according to any one of embodiments 34 to 37,
wherein the second message indicates which of the wireless devices (11; 2400; 2600) associated with the access point (10; 2200; 2500) are allowed to be scheduled for transmission of data in the shared transmission opportunity.

Embodiment 39

The method according to any one of embodiments 34 to 38,
wherein the second message indicates an allowed transmit power of wireless transmissions in the shared transmission opportunity.

Embodiment 40

The method according to any one of embodiments 34 to 39,
wherein the second message indicates time and/or frequency resources of the shared transmission opportunity which are assigned to a spatial channel sounding phase of the access point (10; 2200; 2500).

Embodiment 41

The method according to any one of embodiments 34 to 40,
wherein the second message indicates a duration of a spatial channel sounding phase of the access point (10; 2200; 2500).

Embodiment 42

The method according to any one of embodiments 34 to 41,
wherein the second message indicates time and/or frequency resources of the shared transmission opportunity which are assigned to wireless transmissions of data by the access point (10; 2200; 2500).

Embodiment 43

The method according to any one of embodiments 25 to 42, comprising:
the access point (10; 2200; 2500) sending a third message for coordinating the sharing of the transmission opportunity to at least one of the one or more wireless devices (11; 2400; 2600) associated with the access point (10; 2200; 2500), the third message configuring the at least one of the one or more wireless devices (11; 2400; 2600) to receive at least one spatially multiplexed wireless transmission on the carrier in the shared transmission opportunity.

Embodiment 44

The method according to embodiment 43,
wherein the third message configures the at least one of the one or more wireless devices (11; 2400; 2600) with respect to a spatial channel sounding procedure in the shared transmission opportunity.

Embodiment 45

The method according to any one of embodiments 25 to 44,
wherein the spatial multiplexing in the shared transmission opportunity is based on spatial channel sounding of wireless devices (11; 2400; 2600) with respect to the access points (10; 2000; 2200; 2500) sharing the transmission opportunity.

Embodiment 46

The method according to any one of embodiments 25 to 45, comprising:
in a spatial channel sounding phase of the shared transmission opportunity, the access point (10; 2200; 2500) sending sounding signals and receiving sounding reports from wireless devices (11; 2400; 2600) associated with the access points (10; 2000; 2200; 2500) sharing the transmission opportunity; and
based on the received sounding reports, the access point (10; 2000; 2500) determining a precoding matrix for a spatially multiplexed wireless transmissions to at least one of the one or more wireless devices (11; 2400; 2600) associated with the access point (10; 2200; 2500).

Embodiment 47

The method according to embodiment 46,
wherein the sounding reports are received in multicast transmissions which are receivable by multiple access points (10; 2000; 2200; 2500) sharing the transmission opportunity,

Embodiment 48

The method according to any one of embodiments 25 to 46,
wherein the wireless communication system is based on a Wireless Local Area Network technology according to the IEEE 802.11 standards family.

Embodiment 49

A method of controlling wireless transmissions in a wireless communication system, the method comprising:
a wireless device (11; 2400; 2600) configuring a carrier for communication with an access point (10; 2000; 2200; 2500) of the wireless communication system; and
in a transmission opportunity reserved on the carrier and shared by the access point (10; 2000; 2200; 2500) and one or more other access points (10; 2000; 2200; 2500) of the wireless communication system based on spatial multiplexing of wireless transmissions on the carrier, the wireless device (11; 2400; 2600) receiving at least one spatially multiplexed wireless transmission from the access point (10; 2000; 2200; 2500) or sending at least one spatially multiplexed wireless transmission to the access point (10; 2000; 2200; 2500).

Embodiment 50

The method according to embodiment 49, comprising:
the wireless device (11; 2400; 2600) receiving a message for coordinating the sharing of the transmission opportunity from the access point (10; 2000; 2200; 2500), the message configuring the wireless device (11; 2400; 2600) to receive the at least one spatially multiplexed wireless transmission.

Embodiment 51

The method according to embodiment 50,
wherein the message configures the wireless device (11; 2400; 2600) with respect to a spatial channel sounding procedure in the shared transmission opportunity.

Embodiment 52

The method according to any one of embodiments 50 to 51,
wherein the spatial multiplexing in the shared transmission opportunity is based on spatial channel sounding of wireless devices (11; 2400; 2600) with respect to the access points (10; 2000; 2200; 2500) sharing the transmission opportunity.

Embodiment 53

The method according to any one of embodiments 50 to 52, comprising:
in a spatial channel sounding phase of the shared transmission opportunity, the wireless device (11; 2400; 2600) receiving sounding signals from the access points (10; 2000; 2200; 2500) sharing the transmission opportunity; and based on the received sounding signals, the wireless device (11; 2400; 2600) sending at least one sounding report to the access points (10; 2000; 2200; 2500) sharing the transmission opportunity, the sounding report enabling determination of a precoding matrix for the spatially multiplexed wireless transmissions.

Embodiment 54

The method according to embodiment 53,
wherein the wireless device (11; 2400; 2600) sends the at least one sounding report in at least one multicast transmission which is receivable by multiple access points (10; 2000; 2200; 2500) sharing the transmission opportunity.

Embodiment 55

The method according to any one of embodiments 50 to 54,
wherein the wireless communication system is based on a Wireless Local Area Network technology according to the IEEE 802.11 standards family.

Embodiment 56

An access point (10; 2000; 2500) for a wireless communication system, the access point (10; 2000; 2500) being configured to:
configure a carrier for communication with one or more wireless devices (11; 2400; 2600) associated with the access point (10; 2000; 2500);
contend for access to the carrier;
in response to winning contention for access to the carrier, reserve a transmission opportunity on the carrier; and
cooperate with one or more other access points (10; 2200; 2500) of the wireless communication system by sharing the transmission opportunity based on spatial multiplexing of wireless transmissions on the carrier.

Embodiment 57

The access point (10; 2000; 2500) according to embodiment 56,
wherein the access point (10; 2000; 2500) is configured to perform a method according to any one of embodiments 2 to 24.

Embodiment 58

The access point (10; 2000; 2500) according to embodiment 56 or 57, comprising:
at least one processor (2550), and
a memory (2560) containing program code executable by the at least one processor (2550), whereby execution of the program code by the at least one processor (2550) causes the access point (10; 2000; 2500) to perform a method according to any one of embodiments 1 to 24.

Embodiment 59

An access point (10; 2200; 2500) for a wireless communication system, the access point (10; 2200; 2500) being configured to:
configure a carrier for communication with one or more wireless devices (11; 2400; 2600) associated with the access point (10; 2200; 2500);
contend for access to the carrier;
in response to another access point (10; 2000; 2500) winning contention for access to the carrier, cooperate at least with the access point (10; 2000; 2500) winning the contention by sharing, based on spatial multiplexing of wireless transmissions on the carrier, a transmission opportunity reserved by the access point (10; 2000; 2500) winning the contention.

Embodiment 60

The access point (10; 2200; 2500) according to embodiment 59,
wherein the access point (10; 2200; 2500) is configured to perform a method according to any one of embodiments 26 to 49.

Embodiment 61

The access point (10; 2200; 2500) according to embodiment 59 or 60, comprising: at least one processor (2550), and
a memory (2560) containing program code executable by the at least one processor (2550), whereby execution of the program code by the at least one processor (2550) causes the access point (10; 2200; 2500) to perform a method according to any one of embodiments 25 to 48.

Embodiment 62

A wireless device (11; 2400; 2600), the wireless device (11; 2400; 2600) being configured to: configure a carrier for communication with an access point (10; 2000; 2200; 2500) of the wireless communication system; and in a transmission opportunity reserved on the carrier and shared by the access point (10; 2000; 2200; 2500) and one or more other access points (10; 2000; 2200; 2500) of the wireless communication system based on spatial multiplexing of wireless transmissions on the carrier, receive at least one spatially multiplexed wireless transmission from the access point (10; 2000; 2200; 2500) or send at least one spatially multiplexed wireless transmission to the access point (10; 2000; 2200; 2500).

Embodiment 63

The wireless device (11; 2400; 2600) according to embodiment 62,
wherein the wireless device (11; 2400; 2600) is configured to perform a method according to any one of embodiments 50 to 55.

Embodiment 64

The wireless device (11; 2400; 2600) according to embodiment 62 or 63, comprising: at least one processor (2650), and
a memory (2660) containing program code executable by the at least one processor (2650), whereby execution of the program code by the at least one processor (2650) causes the wireless device (11; 2400; 2600) to perform a method according to any one of embodiments 49 to 55.

Embodiment 65

A system, comprising:
multiple access points (10; 2000; 2200; 2500) each configured to:
configure a carrier for communication with one or more wireless devices (11; 2400; 2600) respectively associated with the access point (10; 2000; 2200; 2500); and
contend for access to the carrier; and
in response to one of the access points (10; 2000; 2200; 2500) winning contention for access to the carrier, cooperate with the one or more other access points (10; 2000; 2200; 2500) by sharing, based on spatial multiplexing of wireless transmissions on the carrier, a transmission opportunity reserved on the carrier by the access point winning the contention.

Embodiment 66

The system according to embodiment 65, further comprising:
at least one wireless device (11; 2400; 2600) configured to receive at least one of the spatially multiplexed wireless transmissions in the shared transmission opportunity.

Embodiment 67

A computer program or computer program product comprising program code to be executed by at least one processor (2550) of an access point (10; 2000; 2200; 2500), whereby execution of the program code causes the access point (10; 2000; 2200; 2500) to perform a method according to any one of embodiments 1 to 48.

Embodiment 68

A computer program or computer program product comprising program code to be executed by at least one processor (2650) of a wireless device (11; 2400; 2600), whereby execution of the program code causes the wireless device (11; 2400; 2600) to perform a method according to any one of embodiments 49 to 55.

The invention claimed is:

1. A method of controlling wireless transmissions in a wireless communication system, the method comprising:
an access point of the wireless communication system configuring a carrier for communication with one or more wireless devices associated with the access point;
the access point contending for access to the carrier;
in response to winning contention for access to the carrier, the access point reserving a transmission opportunity on the carrier;
the access point cooperating with one or more other access points of the wireless communication system by sharing the transmission opportunity based on spatial multiplexing of wireless transmissions on the carrier;
in a spatial channel sounding phase of the shared transmission opportunity, the access point sending sounding signals and receiving sounding reports from one or more wireless devices associated with the access points sharing the transmission opportunity, wherein the sounding reports are received in multicast transmissions which are receivable by multiple access points sharing the transmission opportunity; and
based on the received sounding reports, the access point determining a precoding matrix for spatially multiplexed wireless transmissions to at least one of the one or more wireless devices associated with the access point.

2. The method according to claim 1, further comprising the access point receiving a first message for initiating the sharing of the transmission opportunity from at least one of the one or more other access points.

3. The method according to claim 2, wherein the first message indicates whether the at least one of the one or more other access points supports spatial multiplexing.

4. The method according to claim 2, wherein the first message indicates one or more of the number of antenna elements available for supporting spatial multiplexing at the at least one of the one or more other access points, the number of spatial streams required for transmission of data at the at least one of the one or more other access points, the number of wireless devices associated with the at least one of the one or more other access points and requiring transmission of data in the shared transmission opportunity, or a priority of data to be transmitted in the shared transmission opportunity.

5. The method according to claim 2, wherein the first message comprises a request to participate in the sharing of the transmission opportunity.

6. The method according to claim 2, wherein the access point receives the first message in response to an invitation to participate in the sharing of the transmission opportunity.

7. The method according to claim 1, further comprising the access point sending a second message for coordinating the sharing of the transmission opportunity to at least one of the one or more other access points.

8. The method according to claim 7, wherein the second message indicates one or more of whether the at least one of the one or more other access points is to use spatial multiplexing in the shared transmission opportunity, the number of spatial streams assigned to the at least one of the one or more other access points in the shared transmission opportunity, the number of wireless devices associated with the at least one of the one or more other access points and allowed to be scheduled for transmission of data in the shared transmission opportunity, or which wireless devices associated with the at least one of the one or more other access points are allowed to be scheduled for transmission of data in the shared transmission opportunity.

9. The method according to claim 7, wherein the second message indicates an allowed transmit power of wireless transmissions in the shared transmission opportunity.

10. The method according to claim 7, wherein the second message indicates one or more of a duration of a spatial channel sounding phase of the at least one of the one or more other access points, time and/or frequency resources of the shared transmission opportunity which are assigned to a spatial channel sounding phase of the at least one of the one or more other access points, or time and/or frequency resources of the shared transmission opportunity which are assigned to wireless transmissions of data by the at least one of the one or more other access points.

11. The method according to claim 1, further comprising the access point sending a third message for coordinating the sharing of the transmission opportunity to at least one of the one or more wireless devices associated with the access point, the third message configuring the at least one of the one or more wireless devices to receive at least one spatially multiplexed wireless transmission on the carrier in the shared transmission opportunity.

12. The method according to claim 11, wherein the third message configures the at least one of the one or more wireless devices with respect to a spatial channel sounding procedure in the shared transmission opportunity.

13. The method according to claim 1, wherein the spatial multiplexing in the shared transmission opportunity is based on spatial channel sounding of wireless devices with respect to the access points sharing the transmission opportunity.

14. The method according to claim 1, wherein the wireless communication system is based on a Wireless Local Area Network technology according to the IEEE 802.11 standards family.

15. A method of controlling wireless transmissions in a wireless communication system, the method comprising:
an access point of the wireless communication system configuring a carrier for communication with one or more wireless devices associated with the access point;
the access point contending for access to the carrier;
in response to another access point winning contention for access to the carrier, the access point cooperating at least with the access point winning the contention by sharing, based on spatial multiplexing of wireless transmissions on the carrier, a transmission opportunity reserved on the carrier by the access point winning the contention;
in a spatial channel sounding phase of the shared transmission opportunity, the access point sending sounding signals and receiving sounding reports from wireless devices associated with the access points sharing the transmission opportunity, wherein the sounding reports are received in multicast transmissions which are receivable by multiple access points sharing the transmission opportunity; and
based on the received sounding reports, the access point determining a precoding matrix for a spatially multiplexed wireless transmissions to at least one of the one or more wireless devices associated with the access point.

16. The method according to claim 15, further comprising the access point sending a first message for initiating the sharing of the transmission opportunity to the access point winning the contention.

17. The method according to claim 16, wherein the first message indicates one or more of whether the access point supports spatial multiplexing, the number of antenna elements available for supporting spatial multiplexing at the access point, the number of spatial streams required for transmission of data at the access point, the number of wireless devices associated with the access point and requiring transmission of data in the shared transmission opportunity, priority of data to be transmitted in the shared transmission opportunity.

18. The method according to claim 15, further comprising the access point receiving a second message for coordinating the sharing of the transmission opportunity from the access point winning the contention.

19. The method according to claim 18, wherein the second message indicates one or more of whether the access point is to use spatial multiplexing in the shared transmission opportunity, the number of spatial streams assigned to the access point in the shared transmission opportunity, the number of the wireless devices associated with the access point which are allowed to be scheduled for transmission of data in the shared transmission opportunity, or which of the wireless devices associated with the access point are allowed to be scheduled for transmission of data in the shared transmission opportunity.

20. The method according to claim 18, wherein the second message indicates one or more of an allowed transmit power of wireless transmissions in the shared transmission opportunity, time and/or frequency resources of the shared transmission opportunity which are assigned to a spatial channel sounding phase of the access point, a duration of a spatial channel sounding phase of the access point, or time and/or frequency resources of the shared transmission opportunity which are assigned to wireless transmissions of data by the access point.

21. The method according to claim 15, further comprising the access point sending a third message for coordinating the sharing of the transmission opportunity to at least one of the one or more wireless devices associated with the access point, the third message configuring the at least one of the one or more wireless devices to receive at least one spatially multiplexed wireless transmission on the carrier in the shared transmission opportunity.

22. The method according to claim 21, wherein the third message configures the at least one of the one or more wireless devices with respect to a spatial channel sounding procedure in the shared transmission opportunity.

23. The method according to claim 15, wherein the spatial multiplexing in the shared transmission opportunity is based on spatial channel sounding of wireless devices with respect to the access points sharing the transmission opportunity.

24. A method of controlling wireless transmissions in a wireless communication system, the method comprising:
a wireless device configuring a carrier for communication with an access point of the wireless communication system;
in a transmission opportunity reserved on the carrier and shared by the access point and one or more other access points of the wireless communication system based on spatial multiplexing of wireless transmissions on the carrier, the wireless device receiving at least one spatially multiplexed wireless transmission from the access point or sending at least one spatially multiplexed wireless transmission to the access point;

in a spatial channel sounding phase of the shared transmission opportunity, the wireless device receiving sounding signals from the access points sharing the transmission opportunity; and based on the received sounding signals, the wireless device sending at least one sounding report to the access points sharing the transmission opportunity, the sounding report enabling determination of a precoding matrix for the spatially multiplexed wireless transmissions, wherein the wireless device sends the at least one sounding report in at least one multicast transmission which is receivable by multiple access points sharing the transmission opportunity.

25. An access point for a wireless communication system, the access point being configured to:

configure a carrier for communication with one or more wireless devices associated with the access point;

contend for access to the carrier;

in response to winning contention for access to the carrier, reserve a transmission opportunity on the carrier;

cooperate with one or more other access points of the wireless communication system by sharing the transmission opportunity based on spatial multiplexing of wireless transmissions on the carrier;

in a spatial channel sounding phase of the shared transmission opportunity, send sounding signals and receive sounding reports from one or more wireless devices associated with the access points sharing the transmission opportunity, wherein the sounding reports are received in multicast transmissions which are receivable by multiple access points sharing the transmission opportunity; and based on the received sounding reports, determine a precoding matrix for spatially multiplexed wireless transmissions to at least one of the one or more wireless devices associated with the access point.

26. An access point for a wireless communication system, the access point being configured to:

configure a carrier for communication with one or more wireless devices associated with the access point;

contend for access to the carrier;

in response to another access point winning contention for access to the carrier, cooperate at least with the access point winning the contention by sharing, based on spatial multiplexing of wireless transmissions on the carrier, a transmission opportunity reserved by the access point winning the contention;

in a spatial channel sounding phase of the shared transmission opportunity, send sounding signals and receive sounding reports from wireless devices associated with the access points sharing the transmission opportunity, wherein the sounding reports are received in multicast transmissions which are receivable by multiple access points sharing the transmission opportunity; and based on the received sounding reports, determine a precoding matrix for a spatially multiplexed wireless transmissions to at least one of the one or more wireless devices associated with the access point.

* * * * *